(12) United States Patent
Murai et al.

(10) Patent No.: US 10,281,768 B2
(45) Date of Patent: May 7, 2019

(54) SURFACE LIGHT SOURCE DEVICE AND LIQUID CRYSTAL DISPLAY DEVICE

(71) Applicant: Mitsubishi Electric Corporation, Tokyo (JP)

(72) Inventors: Hideyuki Murai, Tokyo (JP); Masaaki Takeshima, Tokyo (JP); Kengo Nishikawa, Tokyo (JP); Nobuhiro Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/832,221

(22) Filed: Dec. 5, 2017

(65) Prior Publication Data

US 2018/0246379 A1   Aug. 30, 2018

(30) Foreign Application Priority Data

Feb. 24, 2017   (JP) .................................. 2017-032888

(51) Int. Cl.
*G06F 1/00* (2006.01)
*G02F 1/1335* (2006.01)

(52) U.S. Cl.
CPC .. *G02F 1/133603* (2013.01); *G02F 1/133606* (2013.01); *G02F 1/133608* (2013.01); *G02F 1/133605* (2013.01); *G02F 2001/133607* (2013.01)

(58) Field of Classification Search
CPC ............. G02F 1/1336; G02F 1/133603; G02F 1/133606; G02F 1/133608; G02F 1/133605; G02F 2001/133607

USPC ........................................................ 362/97.3
See application file for complete search history.

(56) References Cited

U.S. PATENT DOCUMENTS

| 8,596,829 B2 | 12/2013 | Yamaguchi | |
| 8,845,119 B2* | 9/2014 | Iiyama | G02B 13/08 313/116 |
| 2006/0066218 A1* | 3/2006 | Yamaguchi | G02B 3/04 313/498 |
| 2009/0052192 A1* | 2/2009 | Kokubo | F21V 5/048 362/311.09 |

(Continued)

FOREIGN PATENT DOCUMENTS

| JP | 2006-286608 A | 10/2006 |
| JP | 2011-044411 A | 3/2011 |

*Primary Examiner* — Daniel A Hess
(74) *Attorney, Agent, or Firm* — Birch, Stewart, Kolasch & Birch, LLP

(57) ABSTRACT

A surface light source device includes: a plurality of LEDs emitting a light; a substrate having the plurality of LEDs mounted thereon; a light distribution control element arranged on the substrate, and distributing the light emitted from the plurality of LEDs; a reflection sheet reflecting a part of the light distributed by the light distribution control element to a display surface side of the surface light source device; a housing accommodating the plurality of LEDs, the substrate, the light distribution control element, and the reflection sheet; and a retaining member retaining the light distribution control element and the substrate under a state in which the retaining member is in contact with a surface of the light distribution control element that is opposite to a surface of the light distribution control element in contact with the substrate.

14 Claims, 22 Drawing Sheets

(56) References Cited

U.S. PATENT DOCUMENTS

| | | | |
|---|---|---|---|
| 2010/0066944 A1* | 3/2010 | Mei | G02B 5/0231 |
| | | | 349/62 |
| 2014/0104816 A1* | 4/2014 | Takasi | G02F 1/133603 |
| | | | 362/97.3 |
| 2015/0160513 A1* | 6/2015 | Lee | G02F 1/133609 |
| | | | 349/69 |
| 2015/0253622 A1* | 9/2015 | Li | G02F 1/133603 |
| | | | 362/97.3 |
| 2015/0338057 A1* | 11/2015 | Kim | G02F 1/133603 |
| | | | 362/97.3 |

* cited by examiner

SURFACE LIGHT SOURCE DEVICE AND LIQUID CRYSTAL DISPLAY DEVICE

BACKGROUND OF THE INVENTION

Field of the Invention

The present invention relates to a surface light source device to be used in lighting equipment, a backlight of a display of an image display device, or the like, and to a technology capable of stably retaining a light distribution control element.

Description of the Background Art

In recent years, the mainstream in a surface light source device to be mainly used in a backlight is to adopt light emitting diodes (LEDs) as light sources. In a direct-type surface light source device where a substrate having a plurality of LEDs mounted thereon is arrayed on a rear surface of the product, a light distribution control element is provided above the LEDs, thereby diffusing a light and irradiating a liquid crystal panel.

Further, the light distribution control element is classified roughly into a circular lens method in which the light distribution control element is arranged so as to cover each of the plurality of LEDs arrayed and arranged linearly, or a cylindrical lens method in which the light distribution control element is arranged so as to cover all of the plurality of LEDs.

In any of the above-mentioned methods, collapse of the positional relationship between the LEDs and the light distribution control element leads to brightness deterioration and color irregularity, and therefore it is important that the surface light source device be provided with structure of retaining the light distribution control element that eliminates the collapse of the positional relationship between the LEDs and the light distribution control element. In order to securely attain joining strength with respect to the substrate without collapsing the positional relationship between the LEDs and the light distribution control element, such a method is generally employed as to bond the light distribution control element to the substrate with use of a dedicated jig.

In Japanese Patent Application Laid-Open No. 2011-44411, for example, a method is disclosed in which the light distribution control element is arranged so as to cover each of the plurality of LEDs. In this method, an example is disclosed in which leg parts of a round stick shape are provided to the light distribution control element, and the leg parts are fixed to the substrate with use of an adhesive.

In Japanese Patent Application Laid-Open No. 2006-286608, for example, a method is disclosed in which the light distribution control element of a cylindrical shape is used, which is arranged so as to cover all of the plurality of LEDs.

In the technology disclosed in Japanese Patent Application Laid-Open No. 2011-44411, the substrate and a light flux controlling member are fixed with an adhesive. However, the substrate produced with aluminum, CEM-3, or the like and the light flux controlling member produced with polymethyl methacrylate (PMMA), polycarbonate (PC), or the like differ in linear expansion coefficient. Therefore, when using the light flux controlling member formed into an elongated shape, that is, the light distribution control element, the adhesive adversely comes off under influence of expansion and contraction due to temperature. Hence, when using the light distribution control element formed into an elongated shape, an adhesive is improper for fixing the substrate and the light distribution control element.

In Japanese Patent Application Laid-Open No. 2006-286608, an optical performance of the light distribution control element formed into an elongated shape is disclosed. However, structure of retaining the substrate having the LEDs mounted thereon and the light distribution control element is not disclosed.

SUMMARY

It is an object of the present invention to provide a technology capable of stably retaining a substrate having light sources mounted thereon and a light distribution control element.

The present invention is intended for a surface light source device for emitting a planar light. According to the prevent invention, the surface light source device includes a plurality of light sources, a substrate, a light distribution control element, a reflection part, a housing, and a retaining member. The plurality of light sources emit a light. The substrate has the plurality of light sources mounted thereon. The light distribution control element is arranged on the substrate, and distributes the light emitted from the plurality of light sources. The reflection part reflects a part of the light distributed by the light distribution control element to a display surface side of the surface light source device. The housing accommodates the plurality of light sources, the substrate, the light distribution control element, and the reflection part. The retaining member retains the light distribution control element and the substrate under a state in which the retaining member is in contact with a surface of the light distribution control element that is opposite to a surface of the light distribution control element in contact with the substrate.

The surface light source device includes the retaining member retaining the light distribution control element and the substrate under a state in which the retaining member is in contact with the surface of the light distribution control element that is opposite to the surface of the light distribution control element in contact with the substrate. Therefore, it is possible to stably retain the substrate having the plurality of light sources mounted thereon and the light distribution control element with the retaining member.

These and other objects, features, aspects and advantages of the present invention will become more apparent from the following detailed description of the present invention when taken in conjunction with the accompanying drawings.

DESCRIPTION OF THE PREFERRED EMBODIMENTS

[First Preferred Embodiment]

Figure 1:
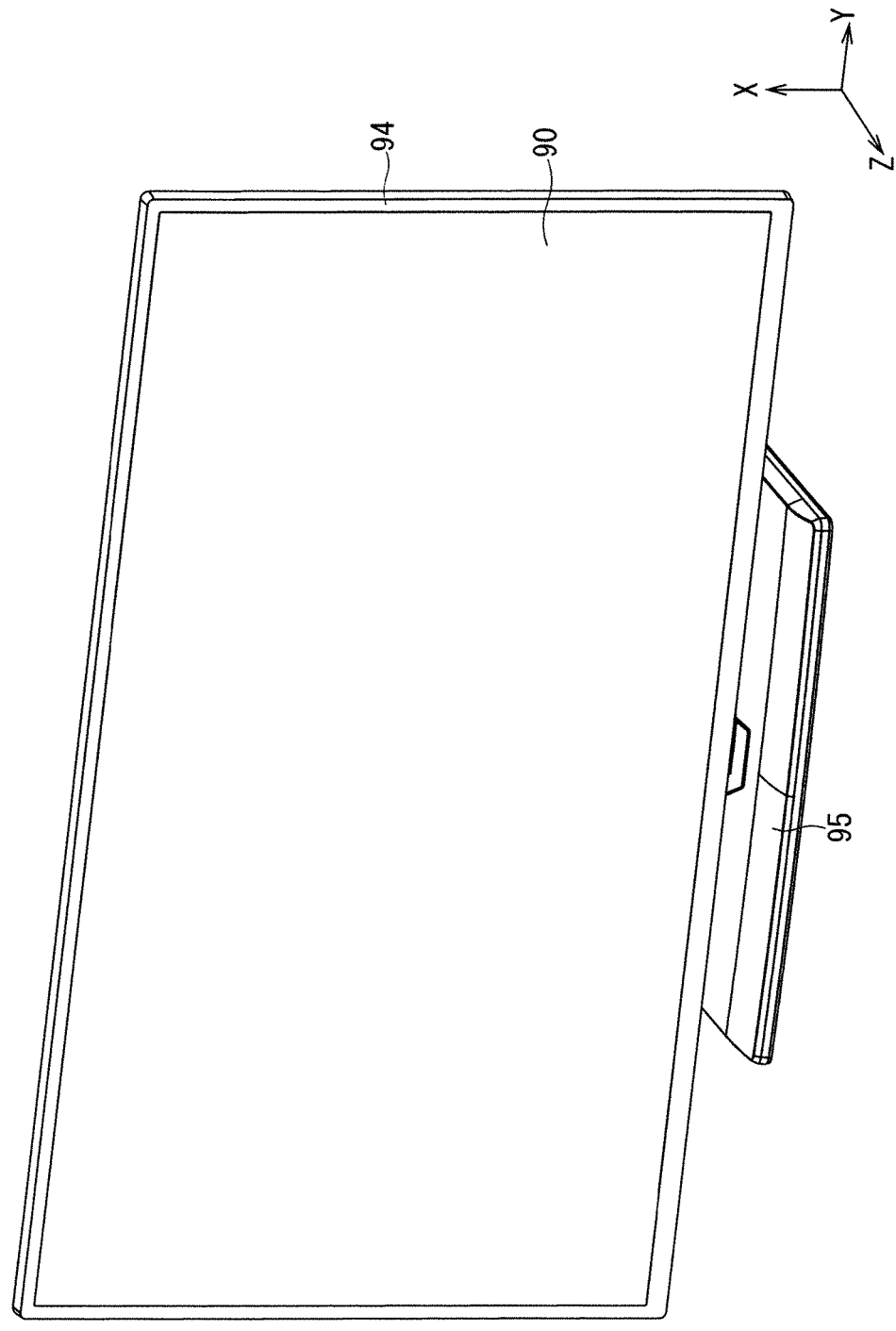
FIG. 1 is a perspective view of a liquid crystal display device according to a first preferred embodiment of the present invention.
Figure 2:
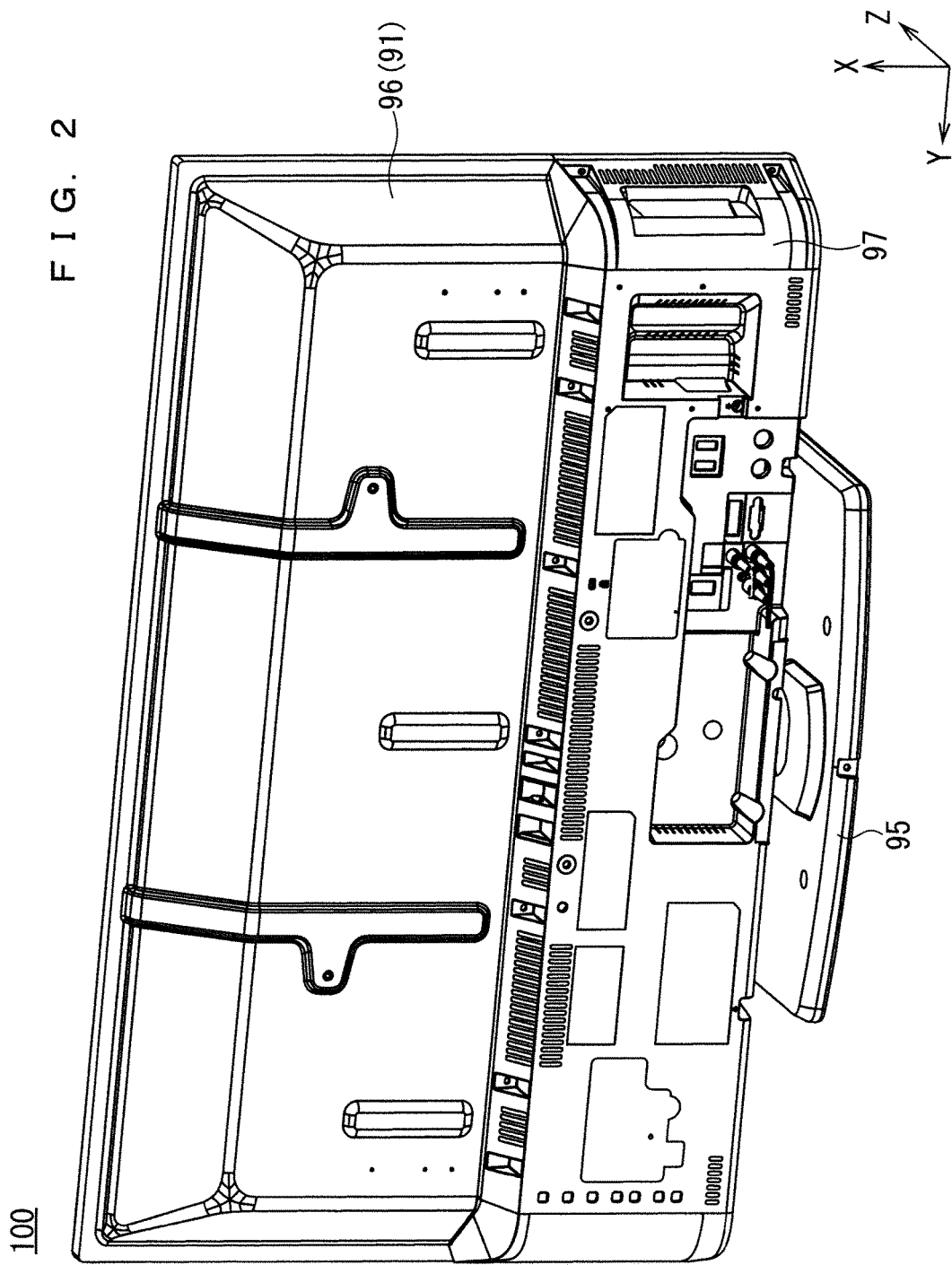
FIG. 2 is a rear perspective view of the liquid crystal display device.
Figure 3:
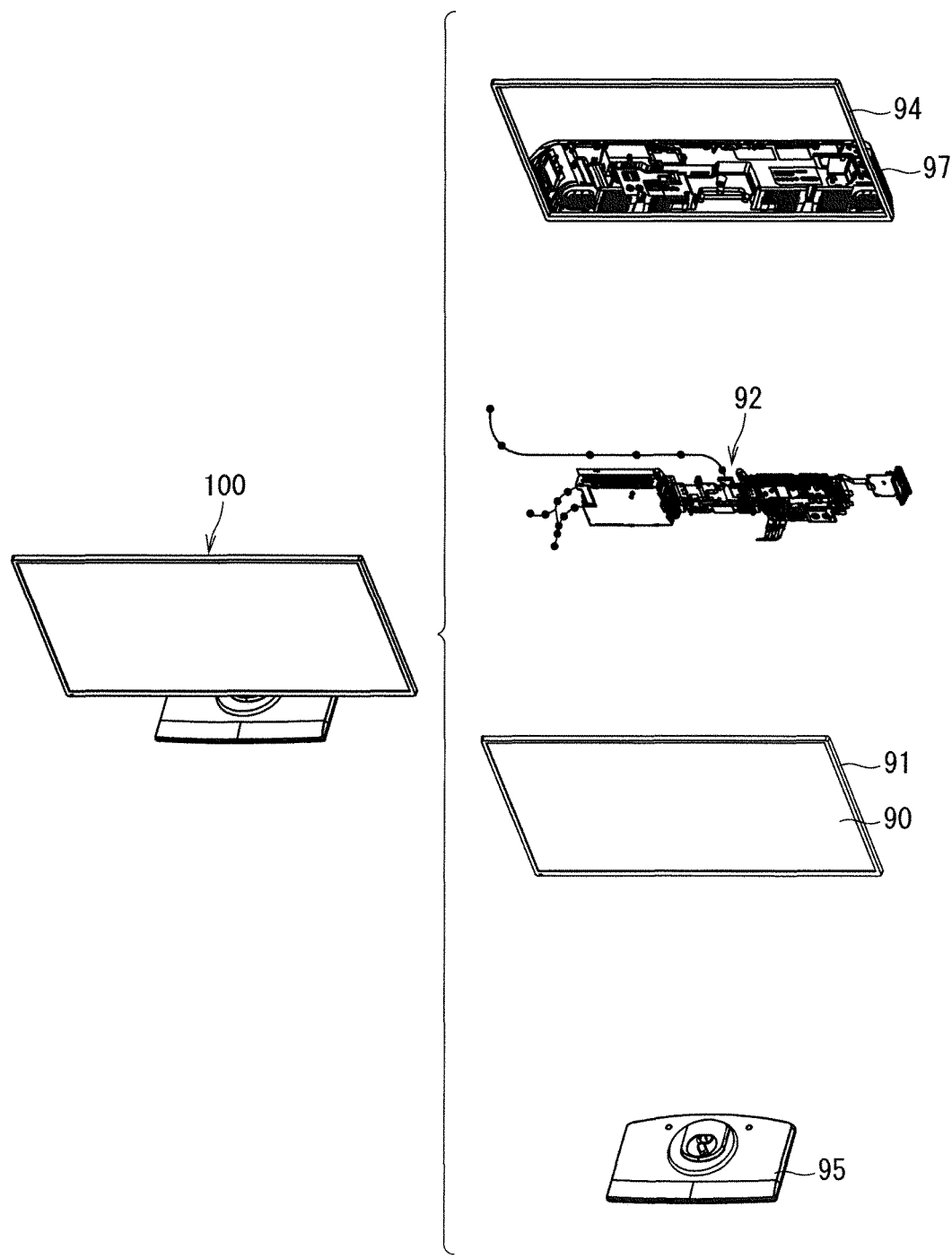
FIG. 3 is an exploded perspective view of the liquid crystal display device.

A first preferred embodiment of the present invention is described below with use of the drawings. FIG. 1 is a perspective view of a liquid crystal display device 100 according to the first preferred embodiment. FIG. 2 is a rear perspective view of the liquid crystal display device 100. FIG. 3 is an exploded perspective view of the liquid crystal display device 100.

As illustrated in FIG. 1 to FIG. 3, the liquid crystal display device 100 is, for example, a direct-type LED liquid crystal television. The liquid crystal display device 100 includes a liquid crystal display part 90, a surface light source device 91, an electrical part 92, a bezel 94, a back cover 97, and a stand 95.

The liquid crystal display part 90 is formed into a rectangular shape in front view, and displays an image. The bezel 94 is formed into a rectangular frame shape. The bezel 94 is attached to a peripheral portion of the liquid crystal display part 90, and retains the liquid crystal display part 90.

The surface light source device 91 is, for example, a backlight. The surface light source device 91 is provided on a rear side of the liquid crystal display part 90, and lights up the liquid crystal display part 90 from the rear side. As illustrated in FIG. 2, the surface light source device 91 includes a housing 96. The housing 96 forms a +X side portion of a rear surface of the liquid crystal display device 100. The back cover 97 is provided to the housing 96 on the −X side, and fauns a −X side portion of the rear surface of the liquid crystal display device 100.

The electrical part 92 is provided between the liquid crystal display part 90 and the back cover 97, and controls the liquid crystal display part 90 and the surface light source device 91. The stand 95 is attached to a −X side end portion of the back cover 97, and supports the liquid crystal display part 90, the surface light source device 91, the electrical part 92, the bezel 94, and the back cover 97.

Figure 4:
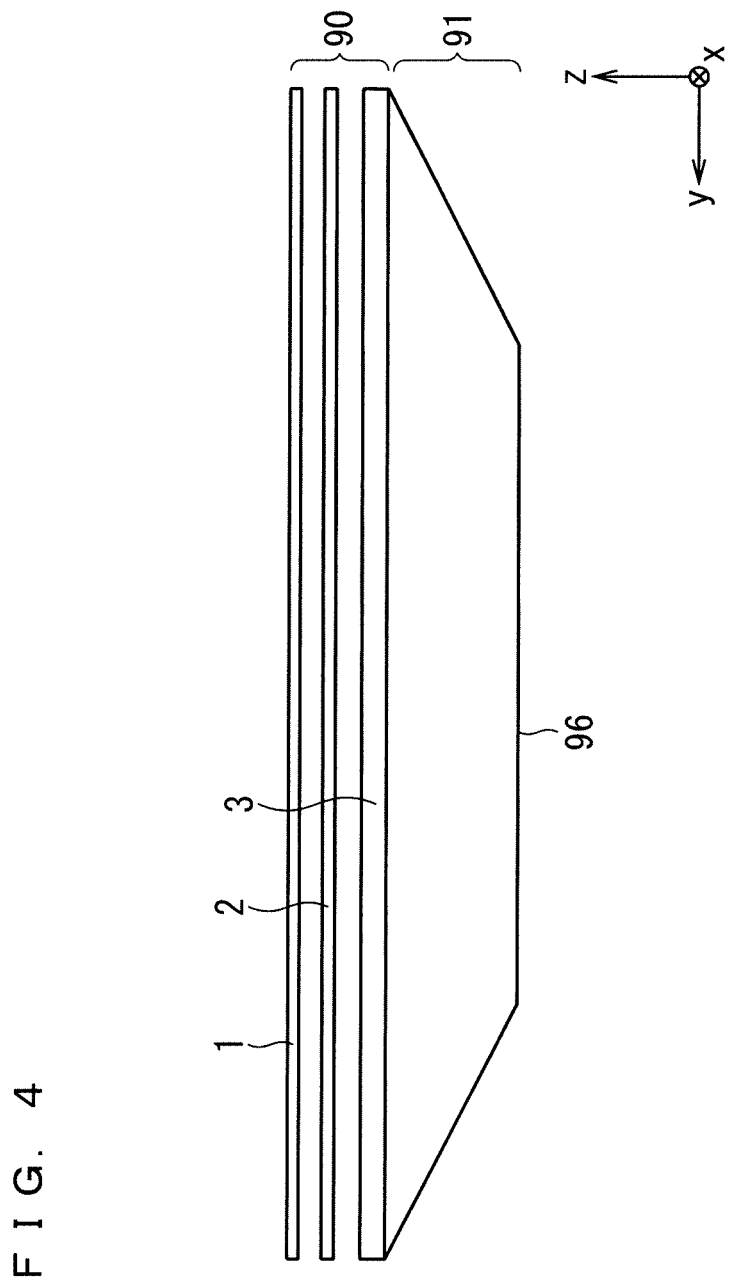
FIG. 4 is an exploded plan view of a liquid crystal display part and a surface light source device.

Next, with use of FIG. 4, structure of the liquid crystal display part 90 and the surface light source device 91 is briefly described. FIG. 4 is an exploded plan view of the liquid crystal display part 90 and the surface light source device 91.

As illustrated in FIG. 4, the liquid crystal display part 90 includes a liquid crystal panel 1, an optical film 2, and a diffuser 3. The diffuser 3 is arranged on the housing 96 of the surface light source device 91 in the +Z direction, and the optical film 2 is arranged on the diffuser 3 on the +Z side. The optical film 2 and the diffuser 3 uniformly diffuse a planar light emitted from the surface light source device 91. The liquid crystal panel 1 is arranged on the optical film 2 on the +Z side, and converts the planar light uniformly diffused by the optical film 2 and the diffuser 3 into an image light.

Inside the housing 96, LEDs 20 each being a light source (see FIG. 5), a reflection sheet 11 (see FIG. 6), and the like are accommodated. Details inside the housing 96 are described later.

Figure 5:
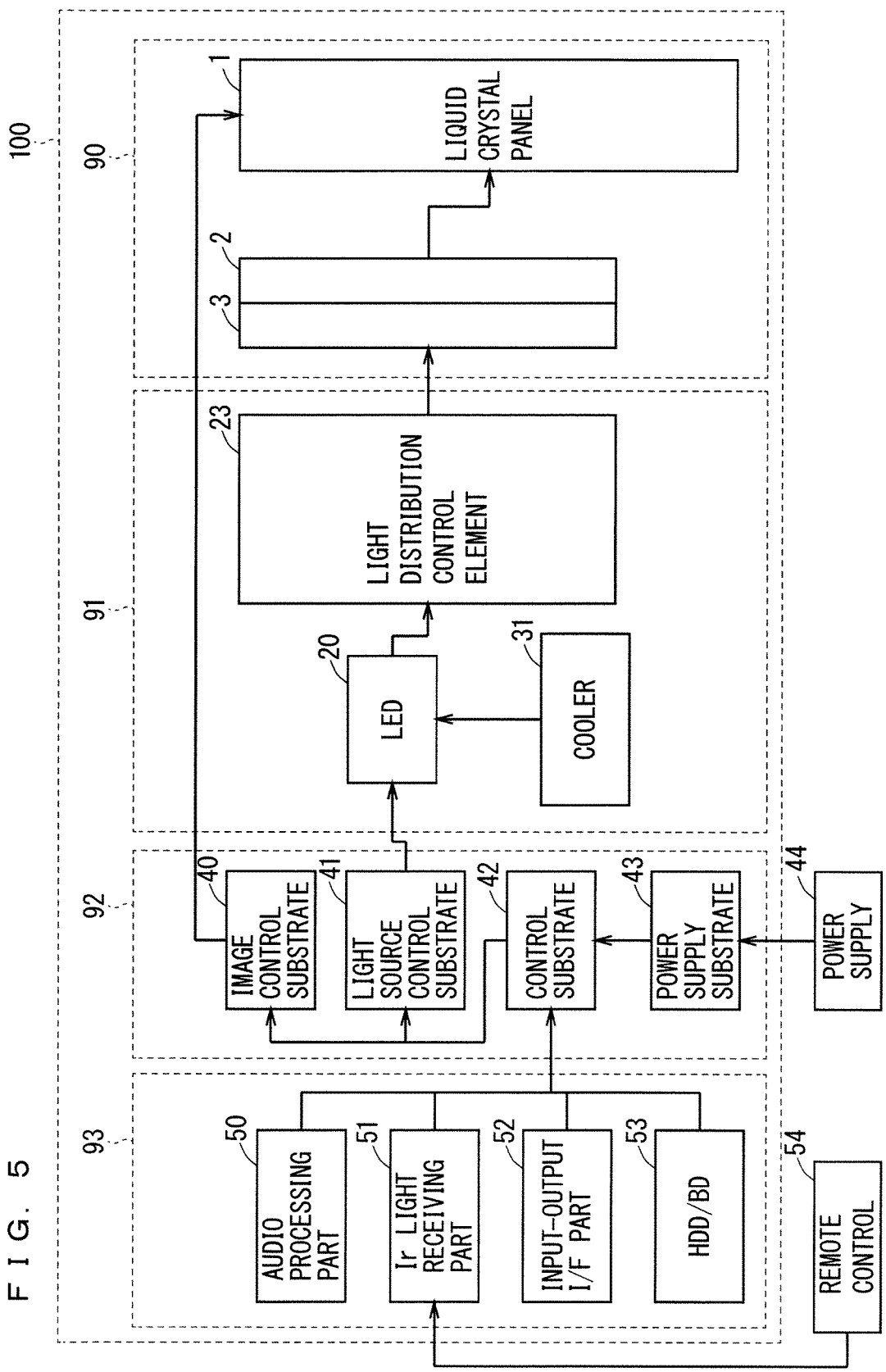
FIG. 5 is a schematic block diagram of the liquid crystal display device.

Next, with use of FIG. 5, electrical configuration of the liquid crystal display device 100 is described. FIG. 5 is a schematic block diagram of the liquid crystal display device 100.

The liquid crystal display device 100 is mainly formed of the liquid crystal display part 90, the surface light source device 91, the electrical part 92, and an input-output part 93. The surface light source device 91 includes a light distribution control element 23, the LEDs 20, and a cooler 31. The electrical part 92 includes an image control substrate 40, a light source control substrate 41, a control substrate 42, and a power supply substrate 43. A power supply 44 of 100V AC is connected to the power supply substrate 43.

Figure 6:
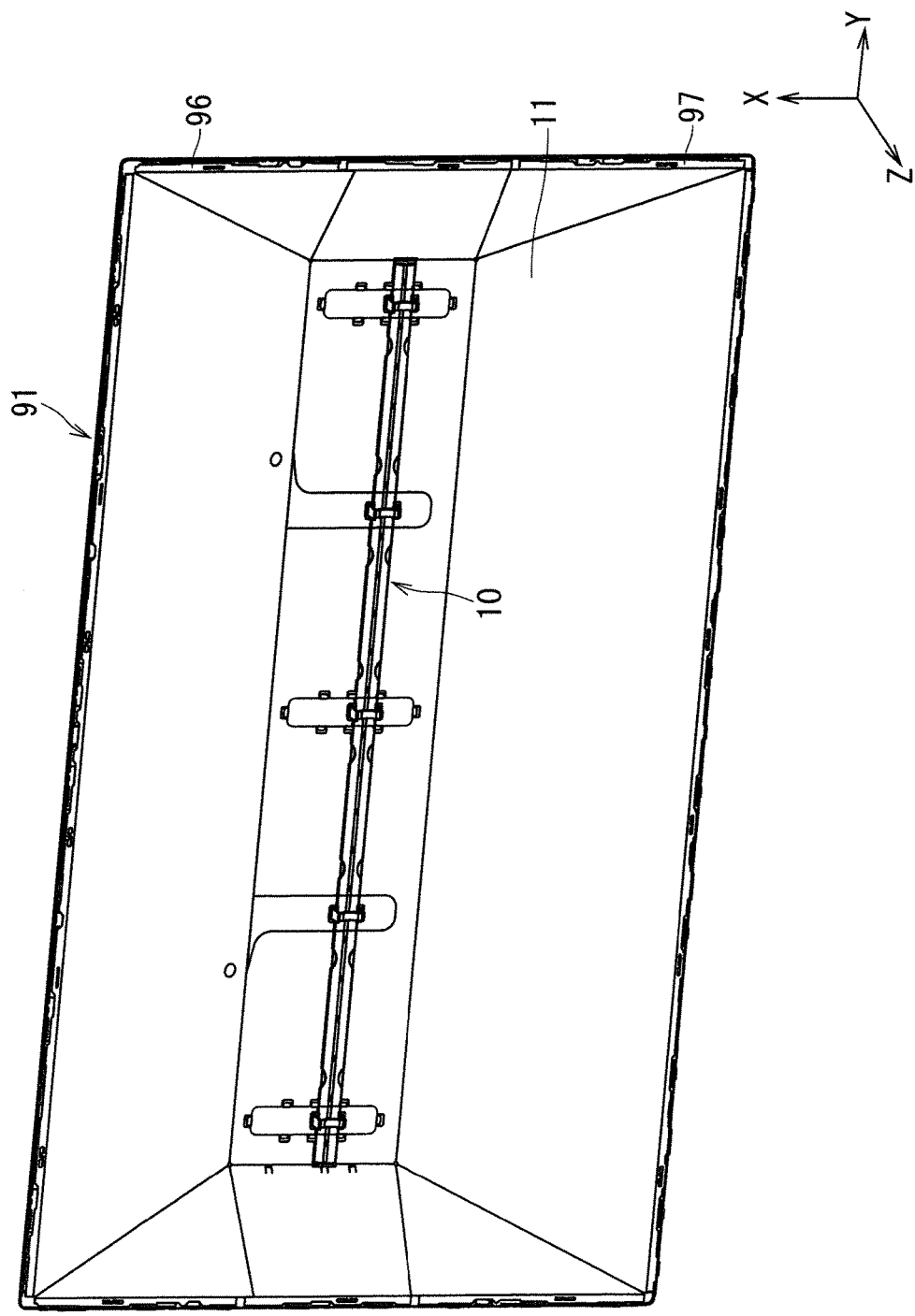
FIG. 6 is a perspective view of the surface light source device and a back cover.
Figure 7:
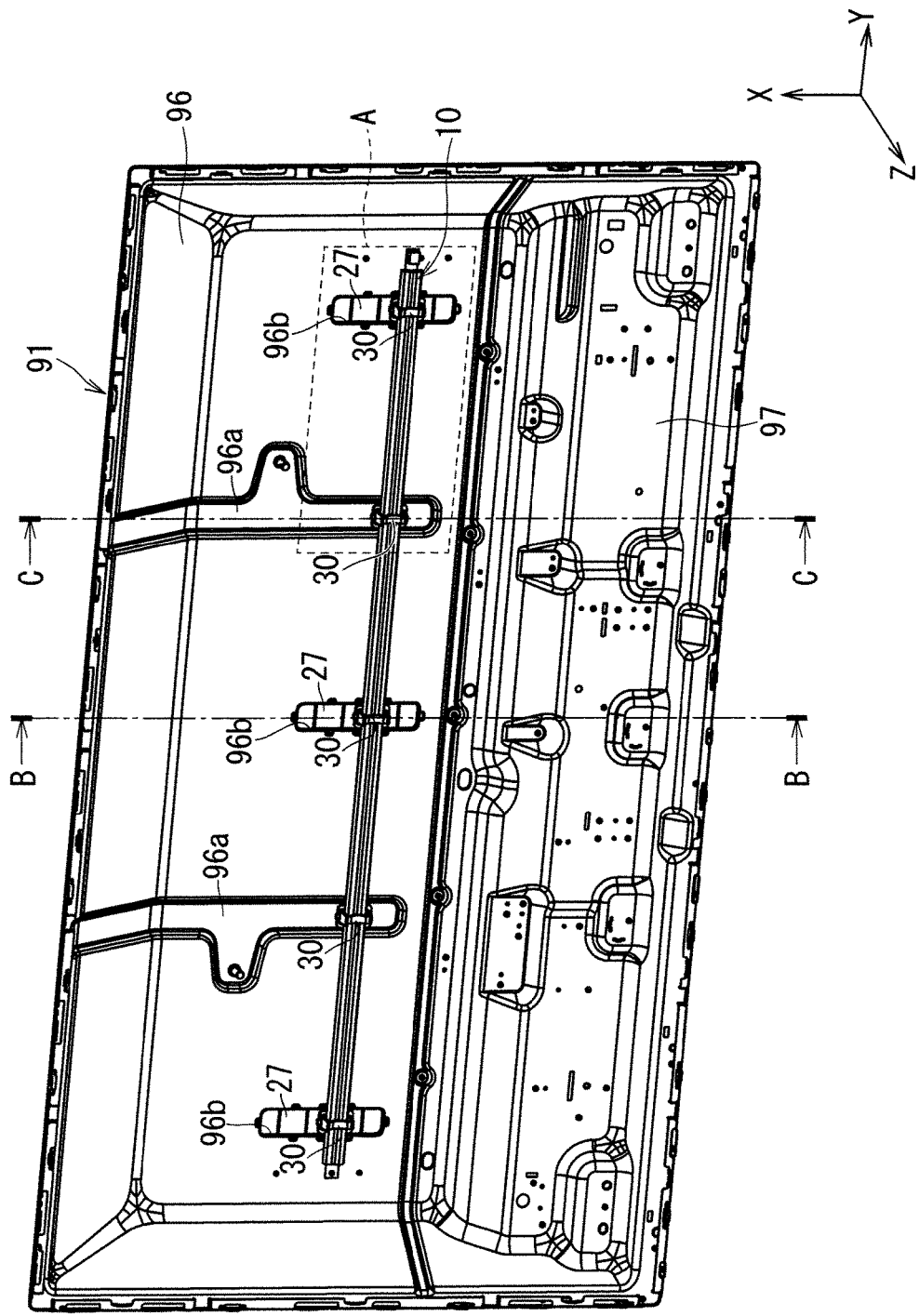
FIG. 7 is a perspective view of the surface light source device and the back cover under a state in which a reflection sheet is removed.
Figure 8:
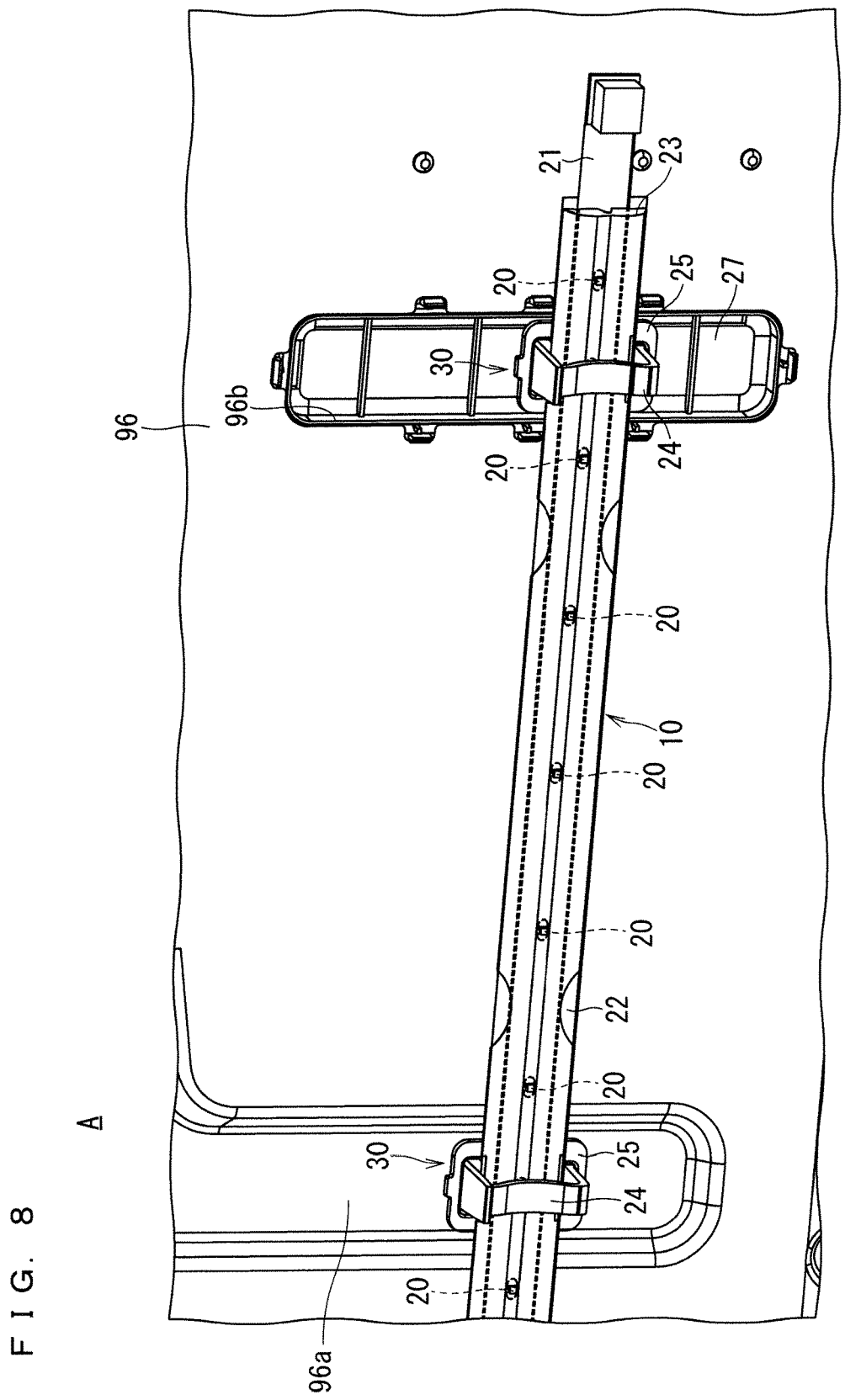
FIG. 8 is an enlarged view of the region A of FIG. 7.
Figure 9:
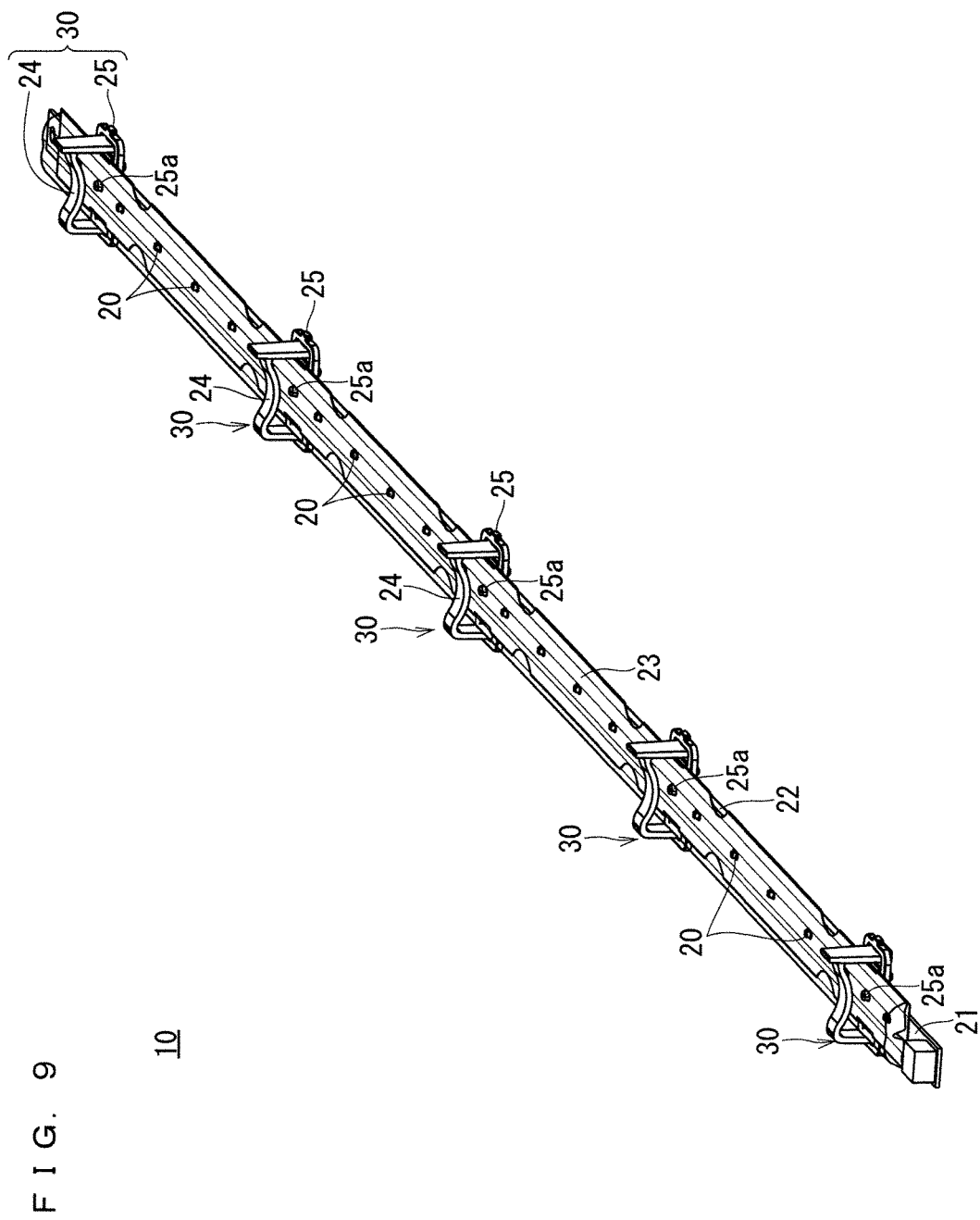
FIG. 9 is a perspective view of a first retaining member and the periphery thereof.
Figure 10:
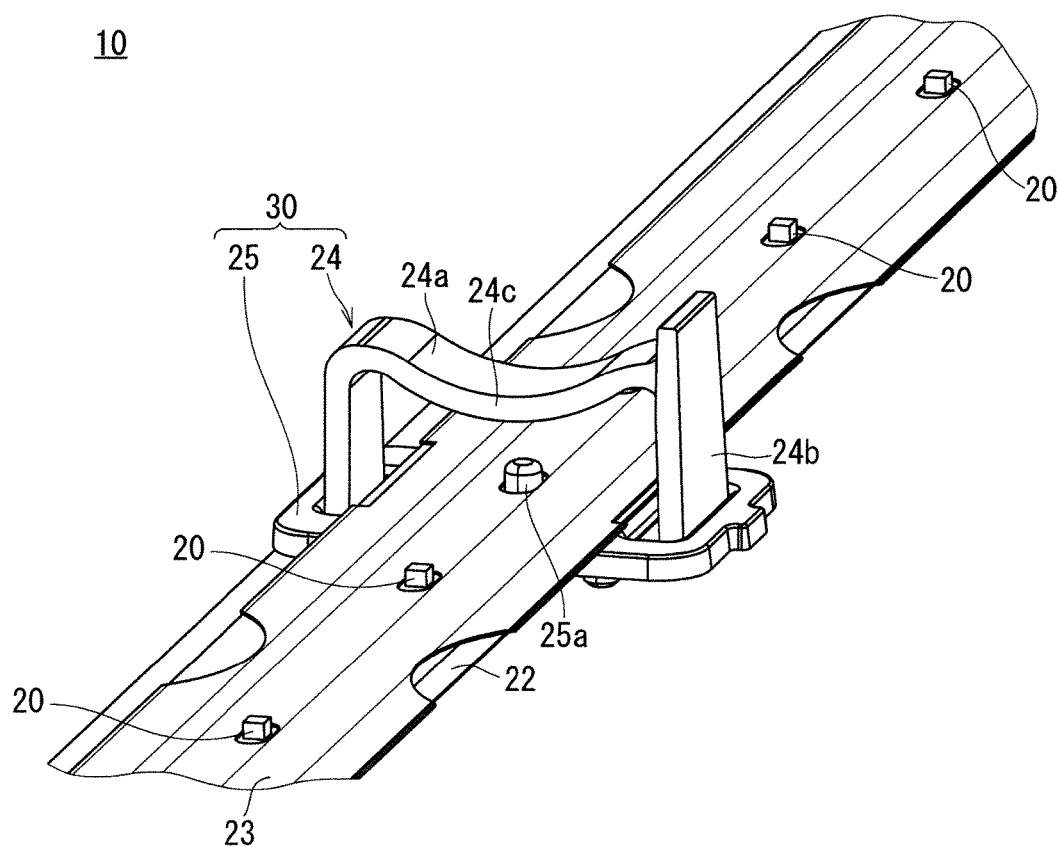
FIG. 10 is an enlarged view of the first retaining member and the periphery thereof.
Figure 11:
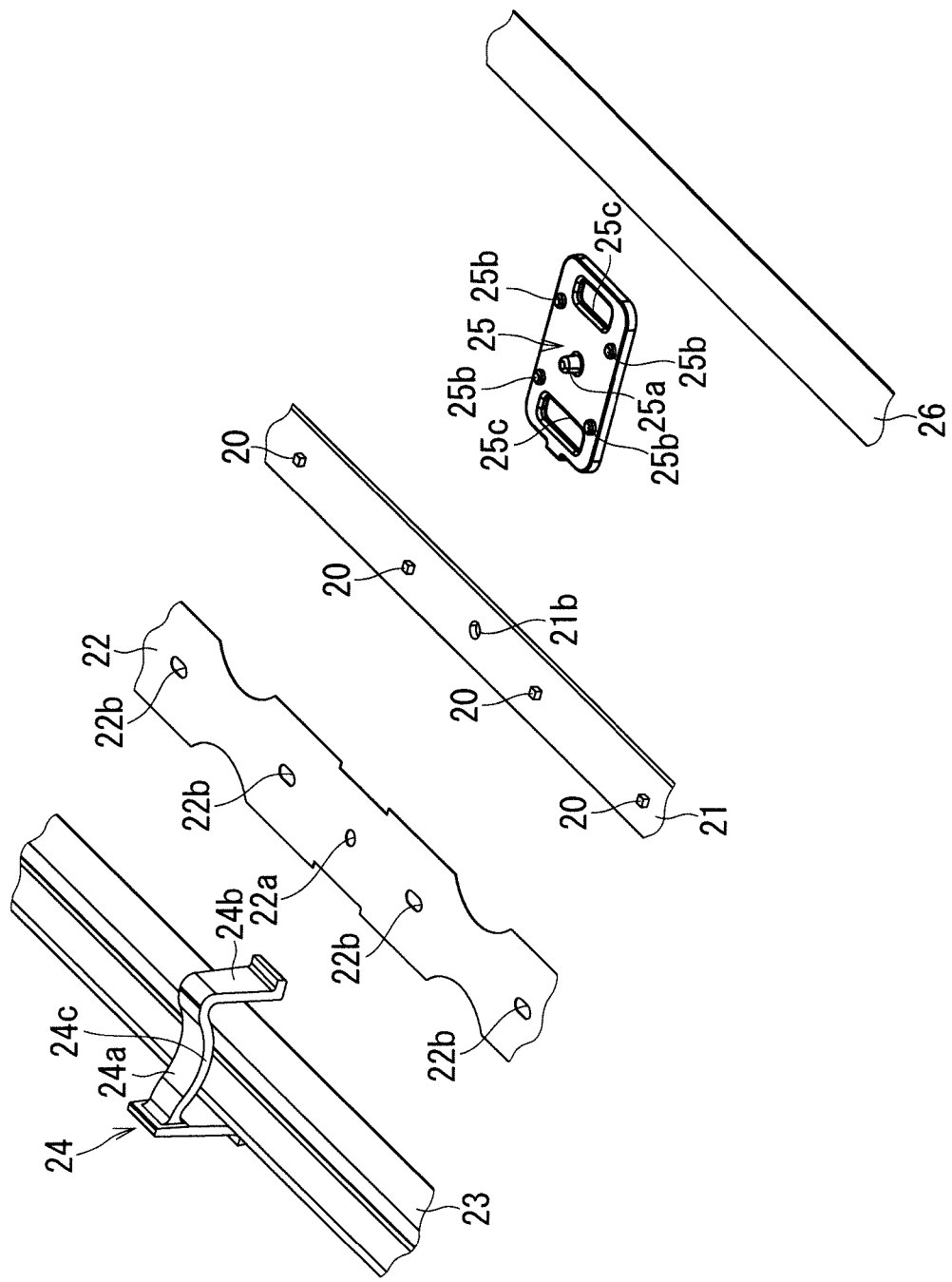
FIG. 11 is an exploded perspective view of the first retaining member and the periphery thereof.
Figure 12:
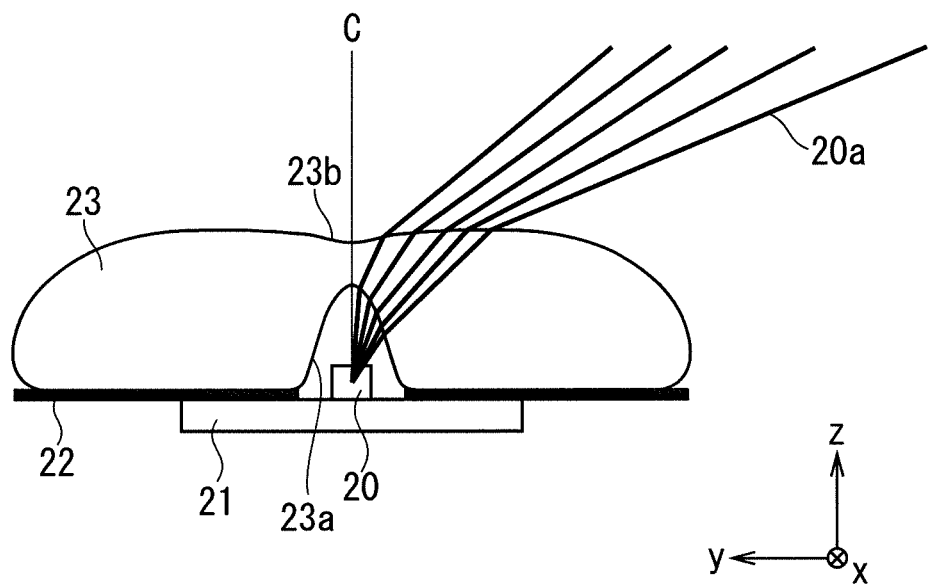
FIG. 12 is an explanatory view for illustrating lights refracted inside a light distribution control element.
Figure 13:
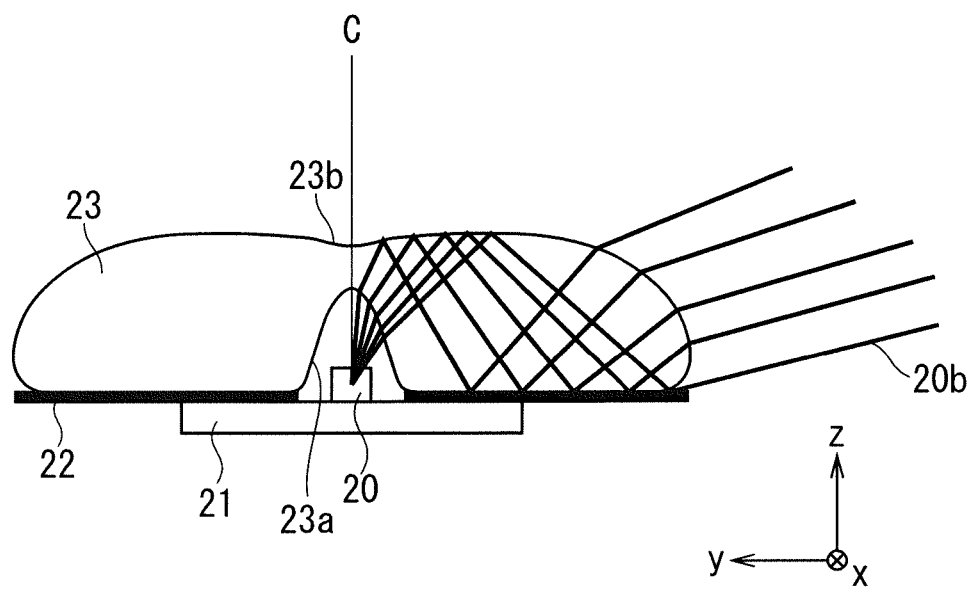
FIG. 13 is an explanatory view for illustrating lights reflected inside the light distribution control element.
Figure 14:
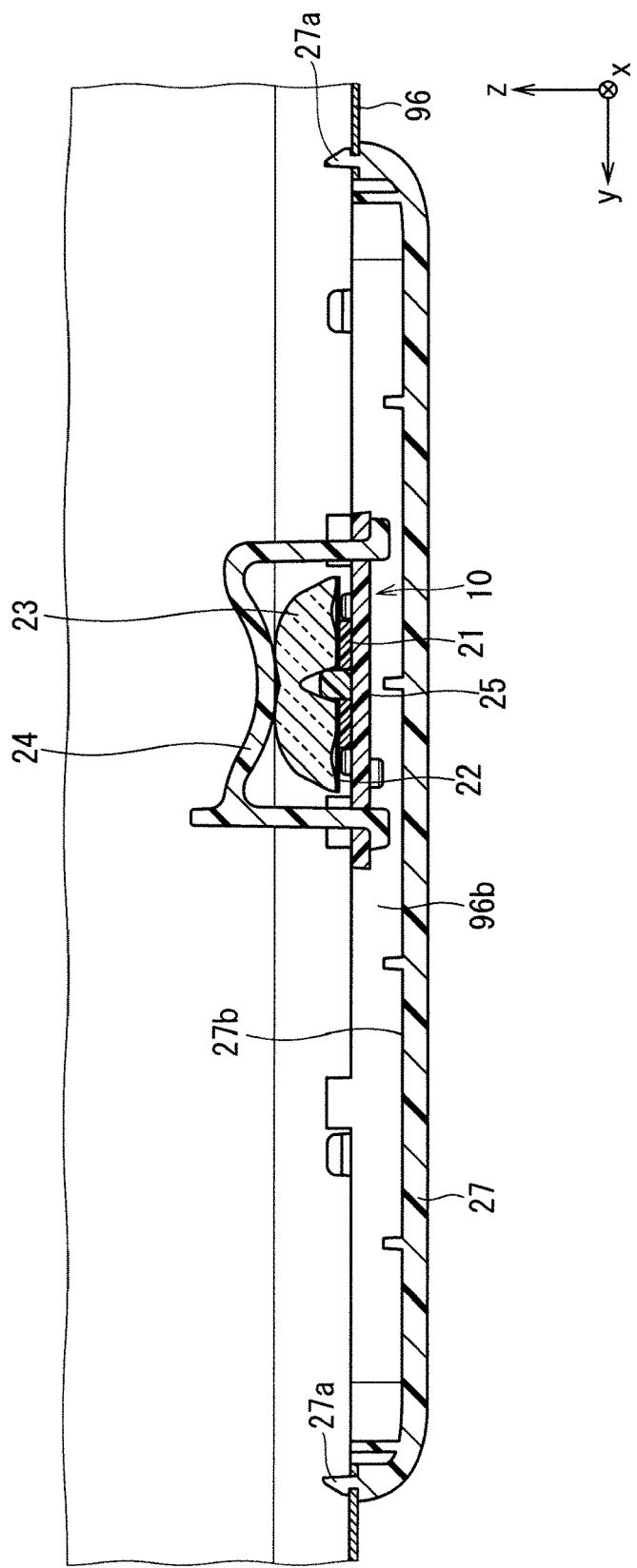
FIG. 14 is a sectional view taken along the line B-B of FIG. 7.
Figure 15:
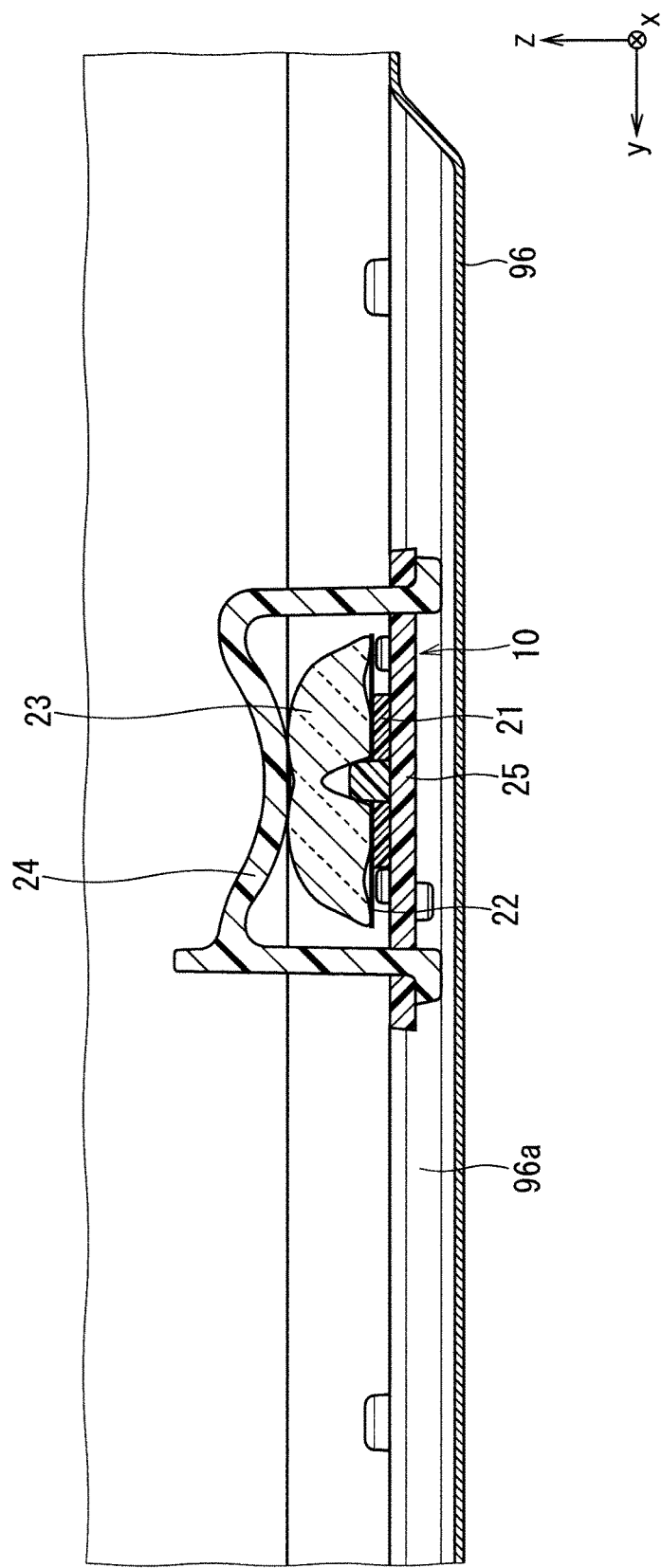
FIG. 15 is a sectional view taken along the line C-C of FIG. 7.
Figure 16:
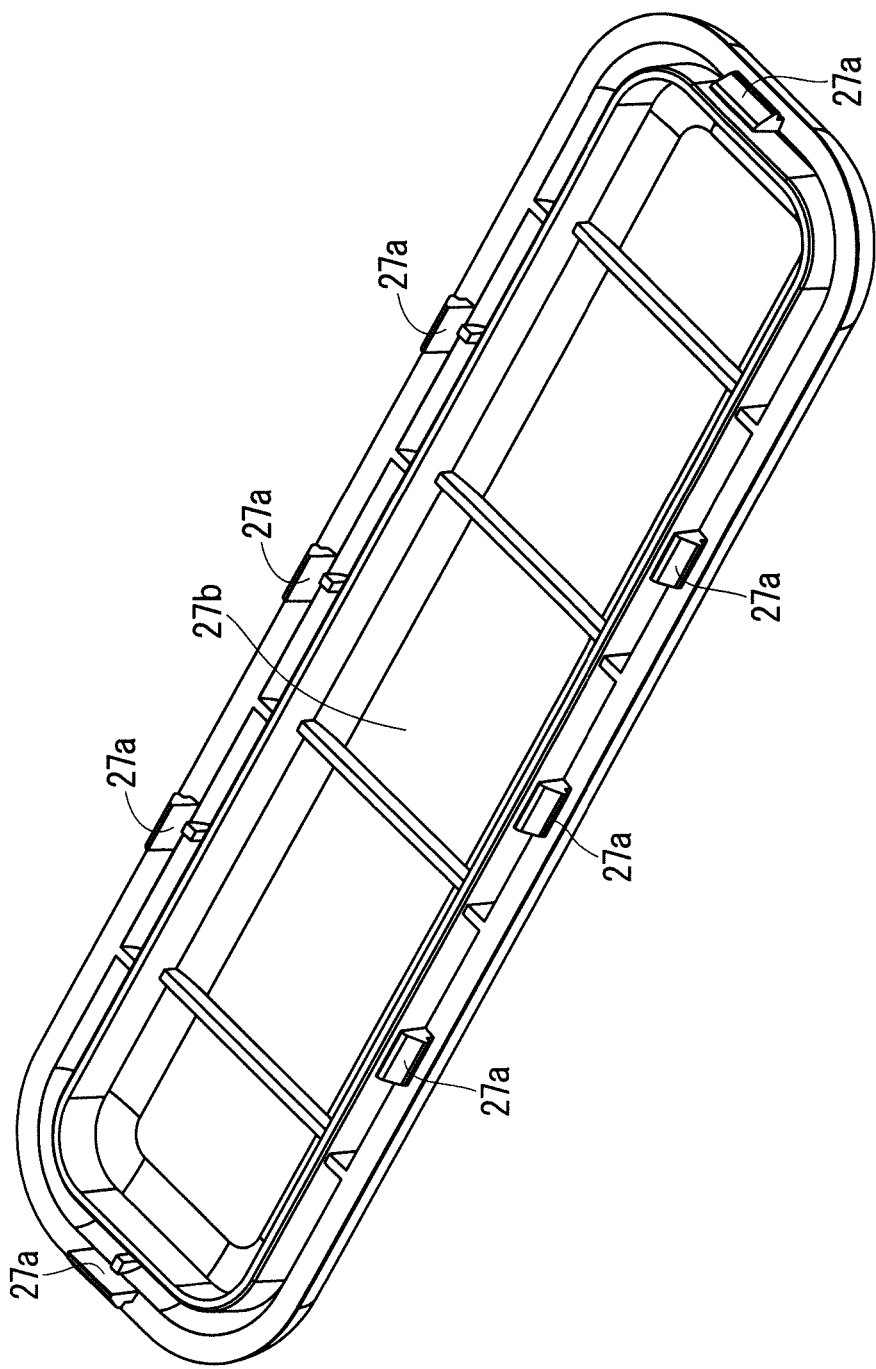
FIG. 16 is a perspective view of a cover member.
Figure 17:
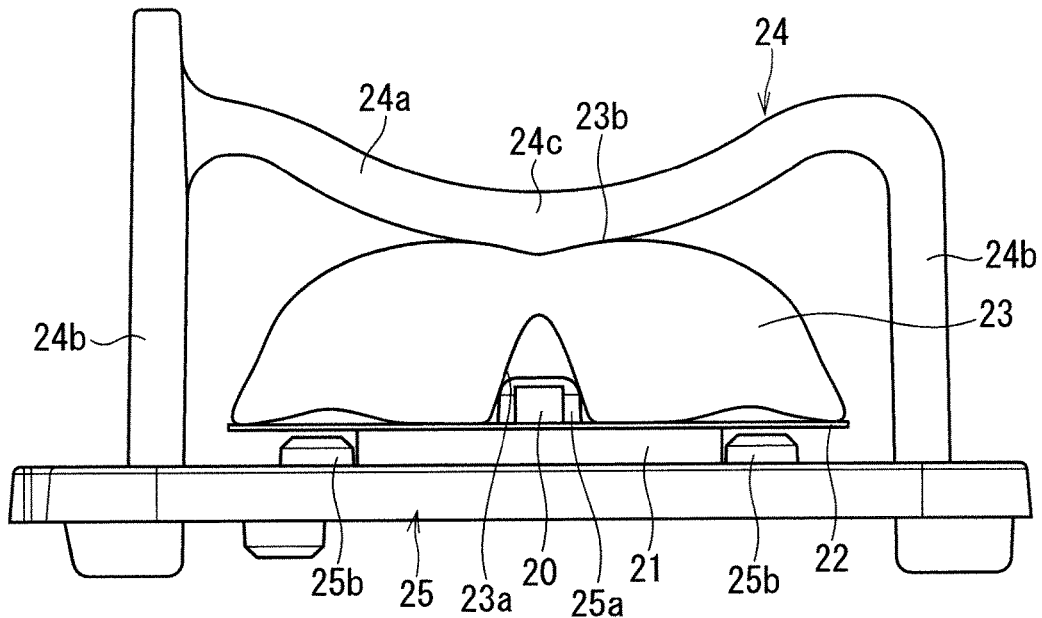
FIG. 17 is a front view of the first retaining member and the periphery thereof
Figure 18:
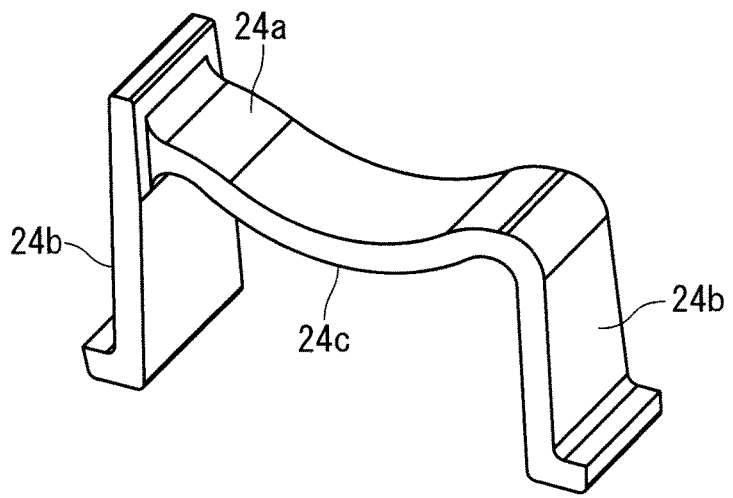
FIG. 18 is a perspective view of a light distribution control element retaining part.
Figure 19:
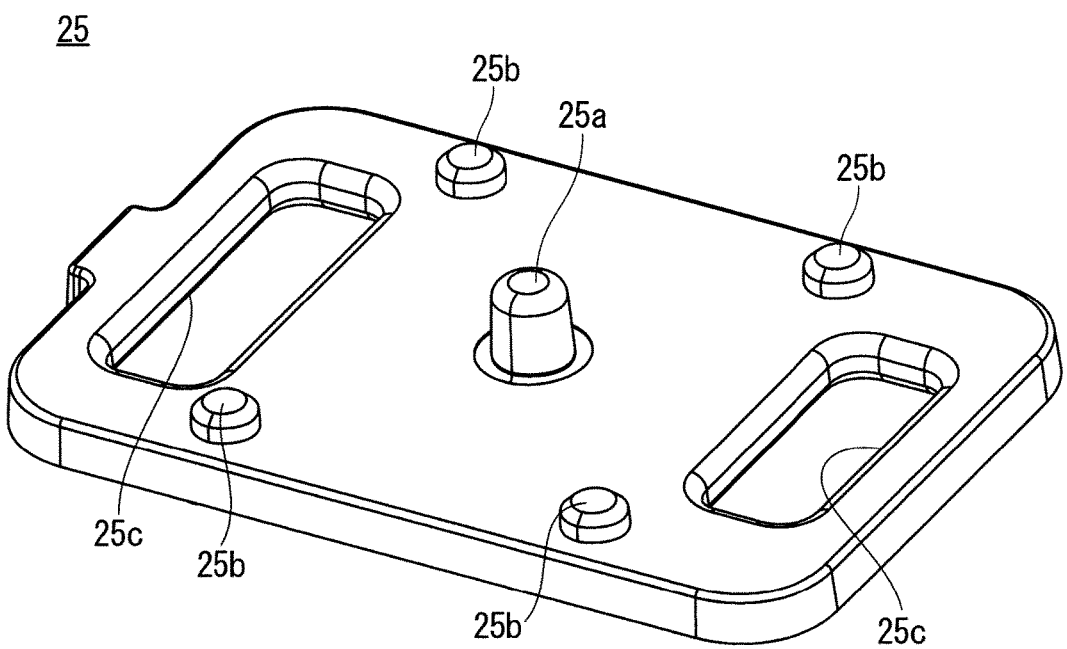
FIG. 19 is a perspective view of a substrate retaining part.

The input-output part 93 includes an audio processing part 50, an infrared (Ir) light receiving part 51, an input-output interface (I/F) part 52, and a hard disk drive (HDD)/Blu-ray disc (BD (registered trademark)) 53. The Ir light receiving part 51 receives a light of an infrared signal output from a remote control 54. Then, a control signal contained in the infrared signal is output from the input-output part 93 to the electrical part 92, the surface light source device 91, and the liquid crystal display part 90. Next, with use of FIG. 6 to FIG. 18, details of the surface light source device 91 are described. FIG. 6 is a rear perspective view of the surface light source device 91 and the back cover 97. FIG. 7 is a perspective view of the surface light source device 91 and the back cover 97 under a state in which the reflection sheet 11 is removed. FIG. 8 is an enlarged view of the region A of FIG. 7. FIG. 9 is a perspective view of a first retaining member 30 and the periphery thereof FIG. 10 is an enlarged view of the first retaining member 30 and the periphery thereof FIG. 11 is an exploded perspective view of the first retaining member 30 and the periphery thereof FIG. 12 is an explanatory view for illustrating lights refracted inside the light distribution control element 23. FIG. 13 is an explanatory view for illustrating lights reflected inside the light distribution control element 23. FIG. 14 is a sectional view taken along the line B-B of FIG. 7. FIG. 15 is a sectional view taken along the line C-C of FIG. 7. FIG. 16 is a perspective view of a cover member 27. FIG. 17 is a front view of the first retaining member 30 and the periphery thereof. FIG. 18 is a perspective view of a light distribution control element retaining part 24. FIG. 19 is a perspective view of a substrate retaining part 25.

As illustrated in FIG. 6 to FIG. 8, the surface light source device 91 includes one assembly 10, the reflection sheet 11, and the housing 96. The surface light source device 91 is a surface light source device to be adopted into a 2K liquid crystal display device. Note that, the cooler 31 illustrated in FIG. 5 is not illustrated in FIG. 6 and the subsequent drawings.

The housing 96 and the back cover 97 are formed into a shape bulging outward so as to be capable of accommodating each member therein under a state in which the housing 96 and the back cover 97 are attached together. The reflection sheet 11 is provided over entire inner surfaces of the housing 96 and the back cover 97. At a position of the reflection sheet 11 where the assembly 10 is to be arranged, a hole larger than a profile of the assembly 10 in front view is formed, and the assembly 10 is exposed from the reflection sheet 11.

As illustrated in FIG. 9 to FIG. 11, the assembly 10 includes a plurality of LEDs 20, a substrate 21, a reflection sheet 22, the light distribution control element 23, the first retaining member 30, and a double-sided tape 26.

The substrate 21 is formed into an elongated shape, and the plurality of LEDs 20 are mounted on a front surface of the substrate 21. More specifically, a plurality of through-holes 21b are formed in the substrate 21 with predetermined intervals. The substrate 21 is arranged under a state in which the plurality of LEDs 20 pass some of the plurality of through-holes 21b and project from the some of the plurality of through-holes 21b.

The light distribution control element 23 is formed into an elongated shape, and is arranged on the substrate 21. The light distribution control element 23 is formed so as to have a length in the longitudinal direction shorter than that of the substrate 21 and a width longer than that of the substrate 21. Therefore, parts of the substrate 21 other than both end portions in the longitudinal direction are covered by the light distribution control element 23. The light distribution control element 23 distributes a light emitted from the plurality of LEDs 20. Specifically, the light distribution control element 23 spreads the light emitted from the plurality of LEDs 20 by refracting the light.

Further, as illustrated in FIG. 12 and FIG. 13, the light distribution control element 23 has, in a surface thereof in contact with the substrate 21, a recessed portion 23a serving as a first recessed portion, which is capable of accommodating the plurality of LEDs 20. The light distribution control element 23 has, in a surface thereof that is opposite to the surface where the recessed portion 23a is formed, a recessed portion 23b serving as a second recessed portion. Both the recessed portions 23a and 23b are formed in the light distribution control element 23 over the longitudinal direction. The plurality of LEDs 20 are arranged along the longitudinal direction of the recessed portion 23a. The light distribution control element 23 is produced through extrusion molding. Therefore, it is possible to produce the light distribution control element 23 at a low cost.

As illustrated in FIG. 10 and FIG. 11, the reflection sheet 22 is formed into an elongated shape similarly as the light distribution control element 23, and is arranged between the light distribution control element 23 and the substrate 21. The reflection sheet 22 reflects a part of the light distributed by the light distribution control element 23 to the diffuser 3 arranged on a display surface side of the surface light source device 91. Usually, a width of the light distribution control element 23 is larger than a width of the substrate 21. Therefore, a width of the reflection sheet 22 is formed so as to be larger than the width of the substrate 21 and to be the same as or larger than the width of the light distribution control element 23. Further, in order not to interfere with a pin 25a of the substrate retaining part 25 to be described later, the reflection sheet 22 has a plurality of holes 22a formed at positions corresponding to the pins 25a. The pins 25a are inserted into the holes 22a. Note that, holes 22b for the LEDs 20 are also formed in the reflection sheet 22.

The first retaining member 30 includes the substrate retaining part 25 and the light distribution control element retaining part 24. The first retaining member 30 is a retaining member retaining the light distribution control element 23, the reflection sheet 22, and the substrate 21 under a state in which the first retaining member 30 is in contact with a surface of the light distribution control element 23 that is opposite to the surface in contact with the substrate 21. Note that, details of the first retaining member 30 are described later. The double-sided tape 26 is formed into an elongated shape similarly as the substrate 21. The double-sided tape 26 is attached to a back surface of the substrate 21 so as to fix the substrate 21 to the housing 96.

Next, the housing 96 is described. As illustrated in FIG. 7, the housing 96 has a plurality of recessed portions 96a and a plurality of through-holes 96b.

As the plurality of recessed portions 96a, two recessed portions 96a are formed, for example, and the two recessed portions 96a are formed in a −Y side portion and a +Y side portion of an inner surface of the housing 96. Further, the two recessed portions 96a are formed so as to extend in the X-axis direction ranging from a +X side end portion to a −X side end portion of the housing 96.

As the plurality of through-holes 96b, three through-holes 96b are formed, for example, and the three through-holes 96b are formed in a −Y side end portion, a center portion, and a +Y side end portion of the inner surface of the housing 96. Further, the three through-holes 96b are formed so as to extend in the X-axis direction ranging from a middle portion to the −X side end portion of the housing 96.

The assembly 10 is arranged toward a side of a −X side end portion of the inner surface of the housing 96 so as to be substantially orthogonal to the two recessed portions 96a and the three through-holes 96b, that is, arranged so as to extend in the Y-axis direction.

Next, details of the first retaining member 30 are described. As illustrated in FIG. 14 and FIG. 15, in order to prevent interference with the inner surface of the housing 96, the first retaining member 30 is arranged on the two recessed portions 96a and the three through-holes 96b. Three cover members 27 are respectively attached to the three through-holes 96b from an outer surface side of the housing 96 so as to prevent the light emitted from the LEDs 20 from leaking through the three through-holes 96b.

As illustrated in FIG. 16, the cover member 27 is formed into a rectangular shape in front view and into a shape larger than a profile of the through-hole 96b in front view so as to be capable of blocking the through-hole 96b from an outer surface side of the housing 96. The cover member 27 includes a plurality of engagement portions 27a and a recessed portion 27b. The recessed portion 27b is formed in a part other than a peripheral portion of an inner surface of the cover member 27.

It has been described that the first retaining member 30 is arranged in the through-hole 96b. In actuality, the first retaining member 30 is arranged in the recessed portion 27b of the cover member 27 that is attached to the through-hole 96b. Further, the plurality of engagement portions 27a are provided in the peripheral portion of the inner surface of the cover member 27. A plurality of engagement holes corresponding to the plurality of engagement portions 27a are respectively formed in a peripheral portion of the through-hole 96b of the outer surface of the housing 96, and the cover member 27 is fixed to the housing 96 through snap-fitting.

As illustrated in FIG. 17 to FIG. 19, the first retaining member 30 includes the substrate retaining part 25 and the light distribution control element retaining part 24. The substrate retaining part 25 is formed into a rectangular shape in plan view, and is fixed to the back surface of the substrate 21. Here, the back surface of the substrate 21 corresponds to a surface of the substrate 21 that is opposite to the surface in contact with the light distribution control element 23. The substrate retaining part 25 includes one pin 25a, four pins 25b, and two through-holes 25c. The pin 25a is provided in a center portion of the substrate retaining part 25. The two through-holes 25c are formed in both end portions of the substrate retaining part 25 in the longitudinal direction. As for the four pins 25b, two pins 25b are respectively provided in peripheral portions of the two through-holes 25c on the pin 25a side. Note that, the pin 25a corresponds to a first protruding portion, and the pin 25b corresponds to a second protruding portion.

The pin 25a is formed into a shape and a length so as to be capable of being inserted into the through-hole 21b from the back surface side of the substrate 21. Further, the pin 25a is accommodated in the recessed portion 23a under a state of being inserted into the through-hole 21b. The substrate 21 and the light distribution control element 23 can be positioned with the pin 25a, and therefore the LEDs 20 and the light distribution control element 23 can be positioned with accuracy.

Under a state in which the substrate 21 is arranged on the substrate retaining part 25, as for the four pins 25b, two pins 25b are respectively arranged in both ends of the substrate 21 in the transverse direction so as to retain the substrate 21. With this, the substrate 21 can be prevented from being rotated. Note that, the pin 25b may have other protruding shapes, and also in such cases the substrate 21 can be prevented from being rotated. Further, the pins 25b only need to be arranged in both the ends of the substrate 21 in the transverse direction, and it suffices that the number of the pins 25b be two or more, not to be limited to four.

The light distribution control element retaining part 24 is formed into an "M" shape in front view, and includes an abutment portion 24a in contact with the recessed portion 23b of the light distribution control element 23, and fixing portions 24b extending from both ends of the abutment portion 24a toward the substrate 21 side. The substrate retaining part 25 and the light distribution control element retaining part 24 are fixed through snap-fitting. More specifically, both distal end portions of the fixing portions 24b are bent outward. Then, under a state in which the fixing portions 24b are respectively inserted into the two through-holes 25c of the substrate retaining part 25, the distal end portions of the fixing portions 24b come into contact with peripheral portions of the two through-holes 25c in a back surface of the substrate retaining part 25. With this, the substrate retaining part 25 and the light distribution control element retaining part 24 are fixed. Here, the light distribution control element retaining part 24 has a bilaterally asymmetrical shape in front view so that the light distribution control element retaining part 24 is easily held by hand and easily fixed to the substrate retaining part 25.

The abutment portion 24a has a protruding portion 24c projecting toward the light distribution control element 23 side. The protruding portion 24c is formed at a position and formed into a shape correspondingly to the recessed portion 23b of the light distribution control element 23. Therefore, under a state in which the substrate retaining part 25 and the light distribution control element retaining part 24 are fixed, the protruding portion 24c is brought into abutment against the recessed portion 23b.

Note that, it is preferable that the light distribution control element retaining part 24 be produced with a transparent or white resin in order to prevent the light from being shielded by causing the light emitted from the LED 20 to easily pass through. Further, it is preferable that the substrate retaining part 25 be also produced with a transparent or white resin. Alternatively, it is preferable that the substrate retaining part 25 be produced with sheet metal such as aluminum in a case where the LED 20 has a problem in heat dissipating performance.

As illustrated in FIG. 7 and FIG. 9, five first retaining members 30 are arranged in one assembly 10. Each of the five first retaining members 30 is arranged at a center portion between adjacent LEDs 20 out of the plurality of LEDs 20. In a case where the number of the first retaining members 30 is small, a force for retaining the substrate 21 and the light distribution control element 23 is weakened, which may adversely cause the substrate 21 and the light distribution control element 23 to come out of contact and be separated apart. On the other hand, in a case where the number of the first retaining members 30 is large, in-plane uniformity of the liquid crystal display device 100 may be lowered due to shielding of the light emitted from the LED 20.

As a result of the investigation conducted by investors of the present invention, it is preferable that an interval between the adjacent first retaining members 30 be 100 mm or more and 300 mm or less. With this, the substrate 21 and the light distribution control element 23 can be prevented from coming out of contact and being separated apart. Further, it is preferable that an interval between the first retaining member 30 and the LED 20 be 15 mm or more. With this, the light emitted from the LED 20 can be prevented from being shielded by the light distribution control element retaining part 24.

Next, with use of FIG. 12 and FIG. 13, light distribution performed by the light distribution control element 23 is described. As illustrated in FIG. 12, a part of a light 20a emitted from the LED 20 is spread by being refracted in the light distribution control element 23 to be emitted. Further, as illustrated in FIG. 13, residue of a light 20b emitted from the LED 20 is reflected by the recessed portion 23b. The residue of the light 20b is reflected again by the reflection sheet 22 so that the light 20b is spread in the Z-axis direction to be emitted. In this manner, the lights 20a and 20b emitted from the LED 20 are efficiently irradiated to the liquid crystal display part 90 by the reflection sheet 22. Here, the reflection sheet 22 corresponds to a reflection part. Note that, the optical axis C corresponds to the Z-axis direction.

As described above, the liquid crystal display device 100 according to the first preferred embodiment includes the surface light source device 91 and the liquid crystal panel 1 converting the planar light emitted from the surface light source device 91 into an image light. Further, the surface light source device 91 according to the first preferred embodiment includes the retaining member retaining the light distribution control element 23 and the substrate 21 under a state in which the retaining member is in contact with the surface of the light distribution control element 23 that is opposite to the surface in contact with the substrate 21.

Accordingly, it is possible to stably retain, with the retaining member, the substrate 21 having the plurality of LEDs 20 mounted thereon and the light distribution control element 23.

The light distribution control element 23 has, in the surface in contact with the substrate 21, the recessed portion 23a capable of accommodating the plurality of LEDs 20. The substrate 21 has the through-holes 21b. The retaining member includes the first retaining member 30. The first retaining member 30 includes the pin 25a capable of being inserted into the through-hole 21b from a side of the substrate 21 that is opposite to the side in contact with the light distribution control element 23. Under a state in which the pin 25a is inserted into the through-hole 21b and is accommodated in the recessed portion 23a, the first retaining member 30 is fixed to the substrate 21.

Accordingly, the substrate 21 having the plurality of LEDs 20 mounted thereon and the light distribution control element 23 can be positioned with the pin 25a, and therefore the LEDs 20 and the light distribution control element 23 can be positioned with ease and accuracy.

Further, the elongated light distribution control element 23 can be produced through extrusion molding, and therefore it is possible to produce the light distribution control element 23 at a low cost. With this, the surface light source device 91 and the liquid crystal display device 100 can be realized, which secure in-plane uniformity and are of low-cost.

The first retaining member 30 includes the substrate retaining part 25 in contact with the surface of the substrate 21 that is opposite to the surface in contact with the light distribution control element 23, and the light distribution control element retaining part 24 in contact with the surface of the light distribution control element 23 that is opposite to the surface in contact with the substrate 21. Accordingly, the first retaining member 30 can be realized with simple configuration. With this, it is possible to downsize the surface light source device 91 and the liquid crystal display device 100.

The light distribution control element retaining part 24 and the substrate retaining part 25 are fixed through snap-fitting, and therefore the light distribution control element 23 and the substrate 21 can be stably retained with simple configuration. With this, uniformity of an image to be displayed in a screen can be enhanced.

The light distribution control element retaining part 24 is formed of a transparent resin, and therefore the light emitted from the LED 20 more easily passes through the light distribution control element retaining part 24, which can prevent the light from being shielded. With this, uniformity of an image to be displayed in a screen can be enhanced.

The substrate retaining part 25 is formed of sheet metal, and therefore heat generated in the LED 20 can be dissipated to the outside through intermediation of the substrate retaining part 25. With this, the heat dissipating performance of the LED 20 can be enhanced.

The light distribution control element 23 has the recessed portion 23b in the surface in contact with the light distribution control element retaining part 24. The light distribution control element retaining part 24 has, in the surface in contact with the light distribution control element 23, the protruding portion 24c corresponding to the recessed portion 23b. Therefore, the light distribution control element 23 can be stably retained with the light distribution control element retaining part 24.

The substrate 21 is formed into an elongated shape. The substrate retaining part 25 includes the plurality of pins 25b for respectively retaining both the ends of the substrate 21 in the transverse direction, and therefore the substrate 21 can be prevented from being rotated.

The light distribution control element 23 is formed into an elongated shape so as to cover the plurality of LEDs 20. The plurality of first retaining members 30 are provided. The plurality of first retaining members 30 are arranged along the longitudinal direction of the light distribution control element 23. Therefore, the light emitted from the plurality of LEDs 20 can be efficiently distributed. With this, uniformity of an image to be displayed in a screen can be enhanced.

The plurality of first retaining members 30 are each arranged with the interval of 100 mm or more and 300 mm or less, and therefore the substrate 21 and the light distribution control element 23 can be prevented from coming out of contact and being separated apart.

The plurality of first retaining members 30 are arranged at the center portion between the adjacent LEDs 20 out of the plurality of LEDs 20, and therefore the light emitted from the LED 20 can be prevented from being shielded by the light distribution control element retaining part 24. With this, uniformity of an image to be displayed in a screen can be enhanced.

The recessed portions 96a are formed in the inner surface of the housing 96, and the first retaining members 30 are arranged in the recessed portions 96a. Therefore, interference between the first retaining member 30 and the inner surface of the housing 96 can be prevented.

The through-holes 96b are formed in the housing 96, and the first retaining members 30 are arranged in the through-holes 96b of the housing 96. Therefore, interference between the first retaining member 30 and the inner surface of the housing 96 can be prevented.

[Second Preferred Embodiment]

Figure 20:
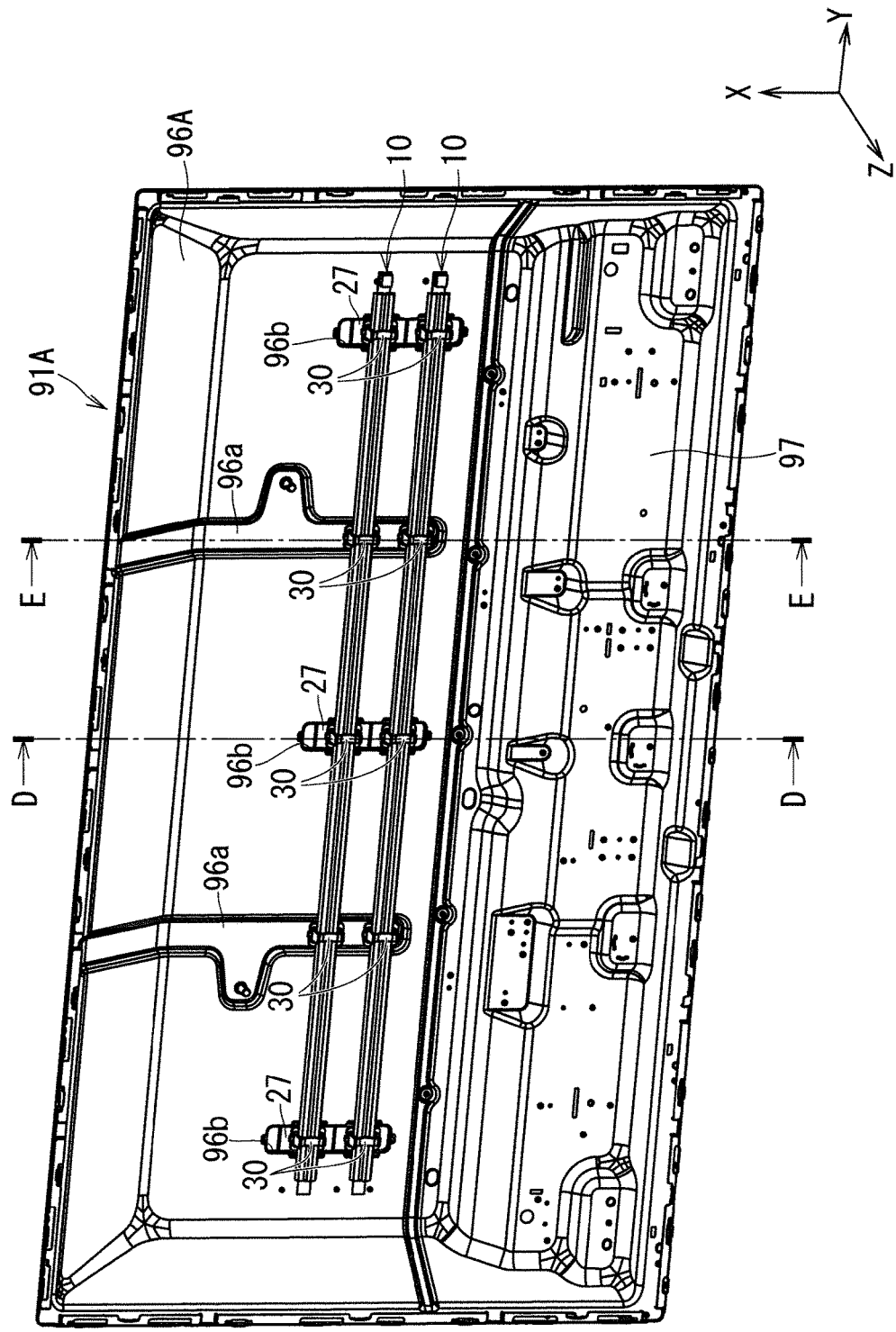
FIG. 20 is a perspective view of a surface light source device and the back cover according to a second preferred embodiment of the present invention.
Figure 21:
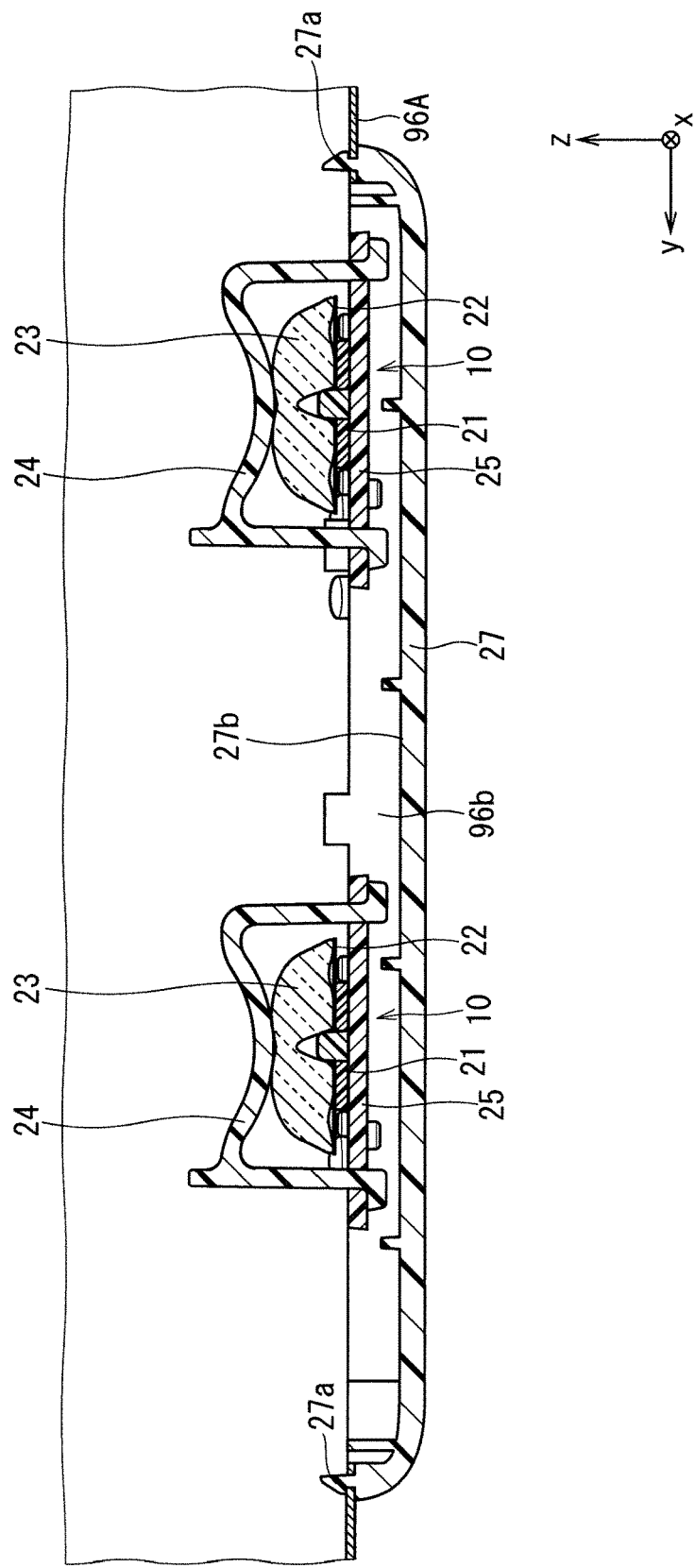
FIG. 21 is a sectional view taken along the line D-D of FIG. 20.
Figure 22:
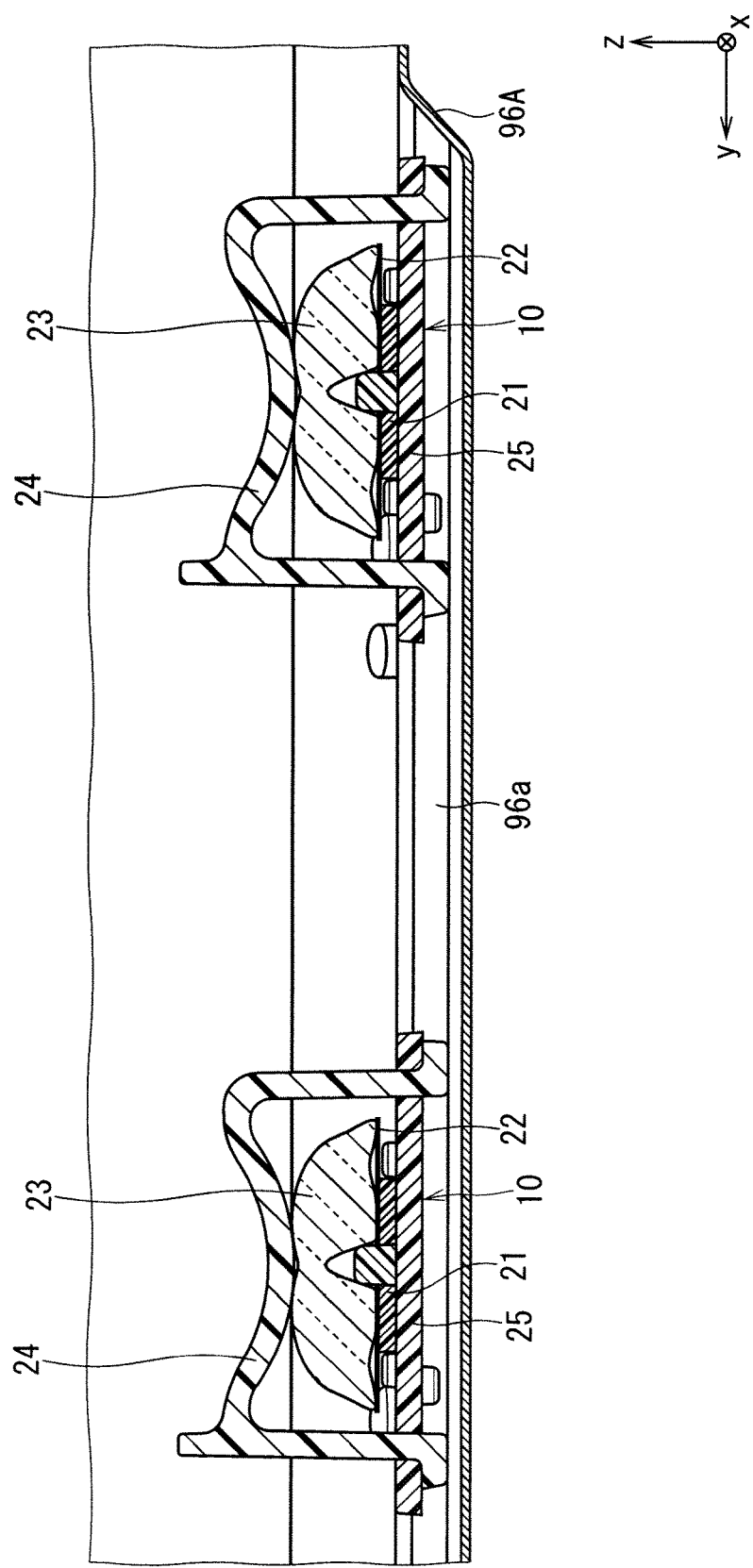
FIG. 22 is a sectional view taken along the line E-E of FIG. 20.

Next, a surface light source device 91A is described according to a second preferred embodiment of the present invention. FIG. 20 is a perspective view of the surface light source device 91A and the back cover 97 according to the second preferred embodiment. FIG. 21 is a sectional view taken along the line D-D of FIG. 20. FIG. 22 is a sectional view taken along the line E-E of FIG. 20. Note that, in the second preferred embodiment, the same components as those described in the first preferred embodiment are denoted by the same reference symbols and the description thereof is herein omitted.

As illustrated in FIG. 20 to FIG. 22, in the second preferred embodiment, the surface light source device 91A is a surface light source device to be adopted into a 4K liquid crystal display device. The surface light source device 91A includes two assemblies 10, the reflection sheet 11 (see FIG. 6), and a housing 96A. Generally, in the liquid crystal panel 1 (see FIG. 4), a 4K liquid crystal display device has lower transmittance of light than a 2K liquid crystal display device. Further, applications require different degrees of brightness for a screen of the liquid crystal display device. Therefore, the housing 96A and the cover member 27 are formed such that a plurality of the assemblies 10 can be arranged therein.

As illustrated in FIG. 20, the housing 96A has the plurality of recessed portions 96a and the plurality of through-holes 96b.

As the plurality of recessed portions 96a, two recessed portions 96a are formed, for example, and the two recessed portions 96a are formed in a −Y side portion and a +Y side portion of an inner surface of the housing 96A. Further, the two recessed portions 96a are formed so as to extend in the X-axis direction ranging from a +X side end portion toward a −X side end portion of the housing 96A.

As the plurality of through-holes 96b, three through-holes 96b are formed, for example, and the three through-holes 96b are formed in a −Y side end portion, a center portion, and a +Y side end portion of the inner surface of the housing 96A. Further, the three through-holes 96b are formed so as to extend in the X-axis direction ranging from a middle portion toward the −X side end portion of the housing 96A.

In this manner, lengths of the two recessed portions 96a and the three through-holes 96b in the longitudinal direction in the second preferred embodiment are shorter than lengths of the two recessed portions 96a and the three through-holes 96b in the longitudinal direction in the first preferred embodiment. Therefore, the cover member 27 is formed into a size in accordance with the through-hole 96b of the housing 96 for 2K so as to be compatible with both the housings 96 and 96A for 2K and 4K.

As described above, in the surface light source device 91A according to the second preferred embodiment, the cover member 27 is formed into a size in accordance with the through-hole 96b of the housing 96 for 2K so as to be compatible with both the housings 96 and 96A for 2K and 4K.

Accordingly, the surface light source devices 91 and 91A and the liquid crystal display device 100 having different degrees of brightness can be realized with ease.

[Third Preferred Embodiment]

Figure 23:
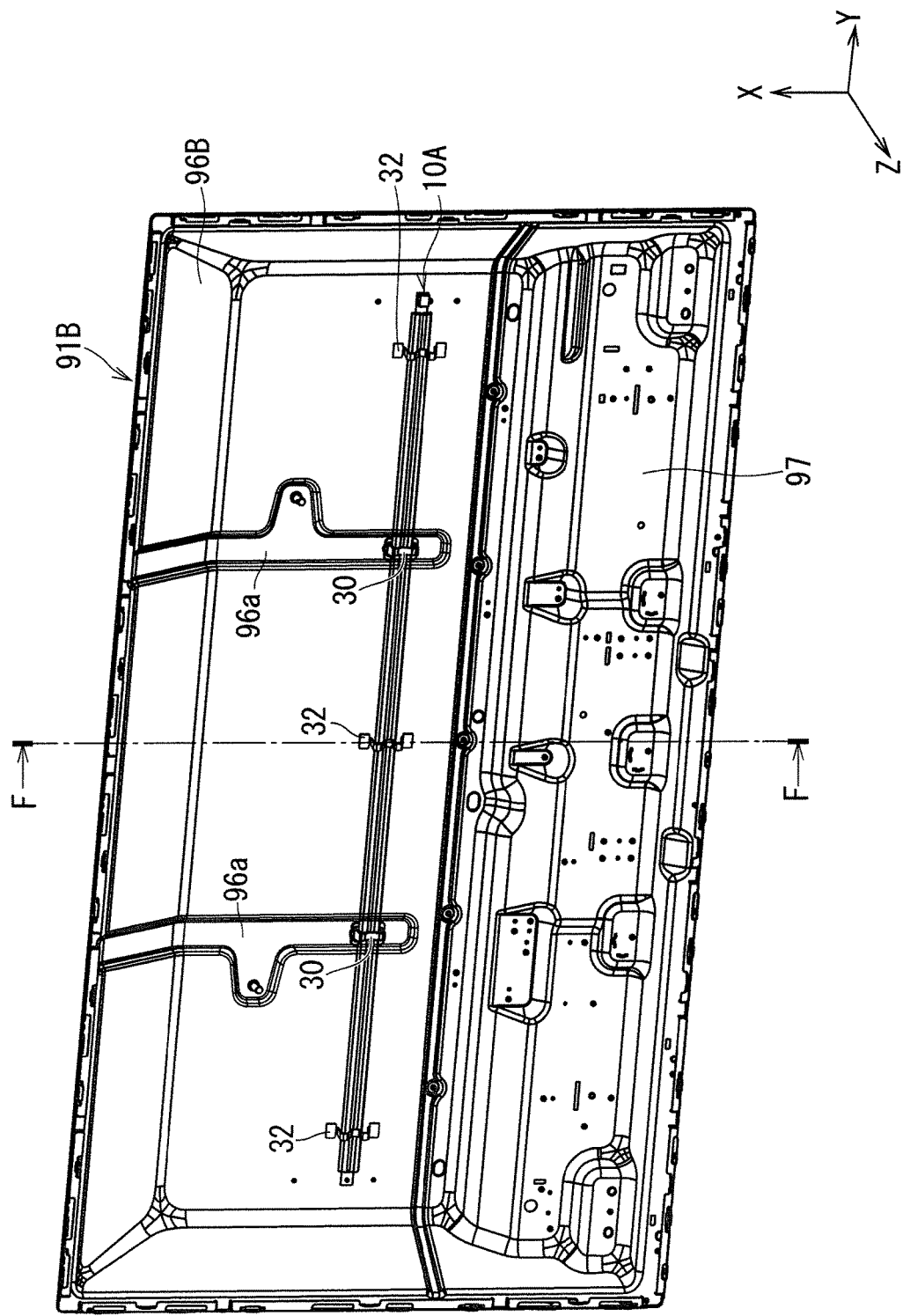
FIG. 23 is a perspective view of a surface light source device and the back cover according to a third preferred embodiment of the present invention.
Figure 24:
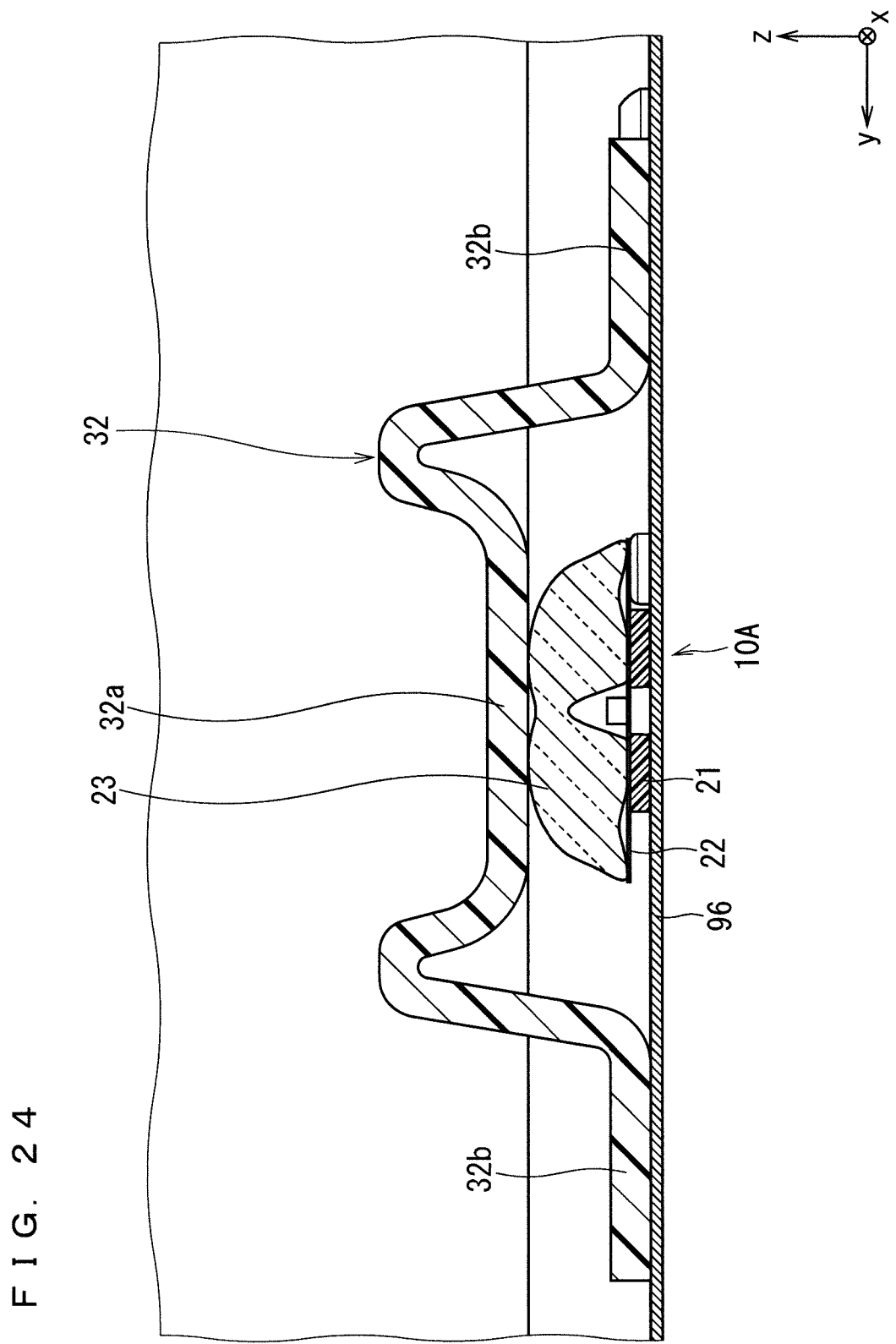
FIG. 24 is a sectional view taken along the line F-F of FIG. 23.

Next, a surface light source device 91B is described according to a third preferred embodiment of the present invention. FIG. 23 is a perspective view of the surface light source device 91B and the back cover 97 according to the third preferred embodiment. FIG. 24 is a sectional view taken along the line F-F of FIG. 23. Note that, in the third preferred embodiment, the same components as those described in the first and second preferred embodiments are denoted by the same reference symbols and the description thereof is herein omitted.

As illustrated in FIG. 23 and FIG. 24, in the third preferred embodiment, the surface light source device 91B is a surface light source device to be adopted into a 2K liquid crystal display device. The surface light source device 91B includes one assembly 10A, the reflection sheet 11 (see FIG. 6), and a housing 96B.

As illustrated in FIG. 23, the housing 96B has the plurality of recessed portions 96a, but omits the plurality of through-holes 96b.

As the plurality of recessed portions 96a, two recessed portions 96a are formed, for example, and the two recessed portions 96a are formed in a −Y side portion and a +Y side portion of an inner surface of the housing 96B. Further, the two recessed portions 96a are formed so as to extend in the X-axis direction ranging from a +X side end portion to a −X side end portion of the housing 96B.

Two first retaining members 30 are respectively arranged in the two recessed portions 96a. In the first and second preferred embodiments, remaining three first retaining members 30 are respectively arranged in the three through-holes 96b. In the third preferred embodiment, however, three second retaining members 32 are arranged in the inner surface of the housing 96B instead of the three first retaining members 30. The three second retaining members 32 are arranged at the same positions as the positions where the three first retaining members 30 are arranged.

The second retaining member 32 is a retaining member retaining the light distribution control element 23, the reflection sheet 22, and the substrate 21 under a state in which the second retaining member 32 is in contact with a surface of the light distribution control element 23 that is opposite to the surface in contact with the substrate 21.

The second retaining member 32 is formed in to an "M" shape in front view, and includes an abutment portion 32a that is in contact with the recessed portion 23b of the light distribution control element 23, and fixing portions 32b extending from both ends of the abutment portion 32a toward the housing 96B side. Parts of the abutment portion 32a other than both the ends thereof are formed into a linear shape, and both the ends of the abutment portion 32a project in the +Z direction. The fixing portions 32b are formed into an "L" shape in front view, and distal end portions of the fixing portions 32b are formed to be parallel to the inner surface of the housing 96B. The distal end portions of the fixing portions 32b are fixed to the inner surface of the housing 96B with an adhesive or a double-sided tape, and the second retaining member 32 is thereby fixed to the housing 96B.

Further, it is preferable that the second retaining member 32 be produced with a transparent or white resin in order to prevent the light from being shielded by causing the light emitted from the LED 20 to easily pass through.

Note that, in the third preferred embodiment, instead of the two first retaining members 30 arranged in the two recessed portions 96a, two second retaining members 32 may be arranged. That is, it is also possible to adopt the second retaining members 32 as all of the retaining members.

As described above, in the surface light source device 91B according to the third preferred embodiment, the retaining member includes the second retaining member 32. The second retaining member 32 has the abutment portion 32a in contact with the surface of the light distribution control element 23 that is opposite to the surface in contact with the substrate 21, and the fixing portions 32b extending from both the ends of the abutment portion 32a and being fixed to the housing 96B.

Accordingly, the through-holes 96b need not be formed in the housing 96B, which can simplify the structure of the housing 96B. Further, the structure of the second retaining member 32 can be simplified compared to the cases of the first and second preferred embodiments.

Note that, in the present invention, each of the preferred embodiments may be freely combined, and each of the preferred embodiments may be appropriately modified or omitted within the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A surface light source device for emitting a planar light, the surface light source device comprising:
   a plurality of light sources emitting a light;
   a substrate having said plurality of light sources mounted thereon;
   a light distribution control element arranged on said substrate, and distributing the light emitted from said plurality of light sources;
   a reflection part reflecting a part of the light distributed by said light distribution control element to a display surface side of said surface light source device;
   a housing accommodating said plurality of light sources, said substrate, said light distribution control element, and said reflection part; and a retaining member retaining said light distribution control element and said substrate under a state in which the retaining member is in contact with a surface of said light distribution control element that is opposite to a surface of said light distribution control element in contact with said substrate, wherein:
said light distribution control element has, in a surface of said light distribution control element in contact with said substrate, a first recessed portion capable of accommodating said plurality of light sources:
said substrate has a through-hole;
said retaining member comprises at least one first retaining member;
said at least one first retaining member has a first protruding portion capable of being inserted into said through-hole from a side of said substrate that is opposite to a side of said substrate in contact with said light distribution control element; and
under a state in which said first protruding portion is inserted into said through-hole and is accommodated in said first recessed portion, said at least one first retaining member is fixed to said substrate.

2. The surface light source device according to claim 1, wherein said at least one first retaining member has a substrate retaining part in contact with a surface of said substrate that is opposite to a surface of said substrate in contact with said light distribution control element, and a light distribution control element retaining part in contact with a surface of said light distribution control element that is opposite to a surface of said light distribution control element in contact with said substrate.

3. The surface light source device according to claim 2, wherein said light distribution control element retaining part and said substrate retaining part are fixed through snap-fitting.

4. The surface light source device according to claim 2, wherein said light distribution control element retaining part is formed of a transparent resin.

5. The surface light source device according to claim 2, wherein said substrate retaining part is formed of sheet metal.

6. The surface light source device according to claim 2, wherein:
said light distribution control element has, in a surface of said light distribution control element in contact with said light distribution control element retaining part, a second recessed portion; and
said light distribution control element retaining part has, in a surface of said light distribution control element retaining part in contact with said light distribution control element, a protruding portion that corresponds to said second recessed portion.

7. The surface light source device according to claim 2, wherein:
said substrate is formed into an elongated shape; and
said substrate retaining part has a plurality of second protruding portions retaining both ends of said substrate in a transverse direction of said substrate.

8. The surface light source device according to claim 1, wherein:
said light distribution control element is formed into an elongated shape so as to cover said plurality of light sources;
said at least one first retaining member comprises a plurality of first retaining members; and
said plurality of first retaining members are arranged along a longitudinal direction of said light distribution control element.

9. The surface light source device according to claim 8, wherein said plurality of first retaining members are each arranged with an interval of 100mm or more and 300mm or less.

10. The surface light source device according to claim 8, wherein each of said plurality of first retaining members is arranged at a center portion between adjacent light sources out of said plurality of light sources.

11. The surface light source device according to claim 1, wherein:
said housing has a recessed portion formed in an inner surface of said housing; and
said at least one first retaining member is arranged in said recessed portion.

12. The surface light source device according to claim 1, wherein:
said housing has a through-hole formed in said housing; and
said at least one first retaining member is arranged in said through-hole of said housing.

13. The surface light source device according to claim 1, wherein:
said retaining member comprises a second retaining member; and
said second retaining member has an abutment portion in contact with a surface of said light distribution control element that is opposite to a surface of said light distribution control element in contact with said substrate, and fixing portions extending from both ends of said abutment portion and being fixed to said housing.

14. A liquid crystal display device, comprising:
the surface light source device of claim 1; and
a liquid crystal panel converting said planar light emitted from said surface light source device into an image light.

* * * * *